United States Patent
Yoda et al.

[11] Patent Number: 5,943,110
[45] Date of Patent: Aug. 24, 1999

[54] LIQUID CRYSTAL DISPLAY DEVICE PROVIDED WITH A LIQUID CRYSTALLINE COMPENSATING FILM HAVING A POSITIVE UNIAXIALITY IN A NEMATIC HYBRID ORIENTATION

[75] Inventors: Eiji Yoda; Takehiro Toyooka; Tadahiro Kaminade; Takuya Matsumoto, all of Yokohama, Japan

[73] Assignee: Nippon Oil Company, Limited, Tokyo, Japan

[21] Appl. No.: 09/088,598

[22] Filed: Jun. 1, 1998

[30] Foreign Application Priority Data

May 30, 1997 [JP] Japan ................................. 9-142475

[51] Int. Cl.$^6$ ....................................................... G02F 1/141
[52] U.S. Cl. ............................. 349/134; 349/76; 349/121
[58] Field of Search .............................. 349/134, 76, 121

[56] References Cited

U.S. PATENT DOCUMENTS 5,250,214 10/1993 Kanemoto et al. ..................... 252/299
5,750,051 5/1998 Goulding et al. ................... 252/299.65

*Primary Examiner*—William L. Sikes
*Assistant Examiner*—Robert J. Hollingshead
*Attorney, Agent, or Firm*—Scully, Scott, Murphy & Presser

[57] ABSTRACT

A liquid crystal display device having improved and broadened viewing angle characteristics. The device includes a liquid crystal cell of the twisted nematic type for driving sandwiched by a pair of upper and lower polarizing plates in which at least one compensating film is inserted between the liquid crystal cell and the upper polarizing plate or between the liquid crystal cell and the lower polarizing plate. Alternatively, two compensating films are respectively inserted between the liquid crystal cell and the upper polarizing plate and between the liquid crystal cell and the lower polarizing plate. The compensating film consists essentially of a liquid crystalline polymer showing optically a positive uniaxiality, the liquid crystalline polymer being fixed in a nematic hybrid orientational order. The device is further characterized by an angle between a tilt direction of the compensating film and a pretilt direction on a liquid crystal cell substrate opposed to a substrate for the liquid crystal cell for driving closest to the compensating film in the range of 165° and 195° C.

5 Claims, 6 Drawing Sheets

———— contrast 100
– – – – contrast 30
-------- contrast 10

———— contrast 100
– – – – contrast 30
-------- contrast 10

LIQUID CRYSTAL DISPLAY DEVICE PROVIDED WITH A LIQUID CRYSTALLINE COMPENSATING FILM HAVING A POSITIVE UNIAXIALITY IN A NEMATIC HYBRID ORIENTATION

FIELD OF THE INVENTION

The present invention relates to a twisted nematic liquid crystal display device which is improved on viewing angle characteristics of a display contrast, gray-scale characteristics and a display color.

PRIOR ART

A twisted nematic liquid crystal display device (hereinafter referred to as TN-LCD) having an active driving with use of a TFT element or an MIM element has not only features of a thin type, light weight and low power consumption, which are inherent in an LCD, but an image quality of a screen display equal to a CRT when being viewed from the front side. For this reason, the liquid crystal device has widely been spread as a display for a note type personal computer, a portable television receiver, aportable information terminal or the like. However, a conventional TN-LCD has not been able to essentially avoid a problem pertaining to a viewing angle that a display color changes or display contrast is lowered when being viewed along an oblique direction to the display screen due to a refractive index anisotropy which a liquid crystal molecule has and such a problem has produced a strong demand for its improvement, which has entailed a variety of trials for the improvements. For example, proposed and developed have been a method in which one pixel is divided into sub-pixels and voltages applied to the sub-pixels are respectively changed in a predetermined ratio (half-tone gray scale method), a method in which one pixel is divided into sub-pixels and a liquid crystal molecule in each sub-pixel has a different direction in which one end of the liquid crystal molecule rises (domain partition method), a method in which a lateral electric field is applied to a liquid crystal (IPS method), a method in which a vertically aligned liquid crystal is driven (VA liquid crystal method), a method in which a combination of a bend deformation cell and a optical compensating plate is adopted (OCB method) and the like and trials have been made based on the methods.

However, while these methods have an effect to some extent, there are needs for changes of constituents, for example an alignment film, an electrode, a low molecular weight liquid crystal, and an orientational order to be controlled of the low molecular weight liquid crystal and the like as compared with corresponding conventional ones. Therefore, there is required establishment of their fabrication technologies and new facilities for them are necessary, which eventually invites hardship in fabrication and a high cost.

There is a method for improvement on a TN-LCD in which a viewing angle is broadened by incorporation into a conventional TN-LCD of additional members for improvement on a viewing angle, for example a compensating film, a compensating plate, a phase difference film and the like in place without any change of configuration of the LCD itself. This method is excellent costwise in that this method requires neither improvement on nor extension of TN-LCD fabrication facilities.

A cause for a viewing angle problem of a TN-LCD of a normally white (NW) mode generally resides in a orientational state of a low molecular weight liquid crystal in a liquid crystal cell for driving in black display under application of a voltage. In this orientational order, the low molecular liquid crystal is almost in a vertical alignment. As the liquid crystal, generally employed is a liquid crystal which optically shows a positive uniaxiality. As constituents to broaden a viewing angle of such a TN-LCD, there has been proposed to use a film which optically shows a negative uniaxiality in order to compensate a positive uniaxiality of a liquid crystal in black display. A method has also been proposed that consideration is given to the fact that a liquid crystal in a liquid crystal cell for driving has an orientational order that the liquid crystal is parallel to or inclined to a cell boundary in the vicinity of an interface with an alignment film even in black display and compensation is achieved by use of a negative uniaxial film whose optical axis is inclined at a predetermined angle.

For example, an optical compensating film using a cholesteric film with an inclined screw axis and a LCD using the same are proposed in the Japanese Patent Application Laid-Open (JP-A) NOs. 4-349424 and 6-250166.

There is further proposed a LCD which uses a compensator having a negative uniaxiality with an inclined optical axis in the Japanese Patent Application Laid-Open (JP-A) NOs. 5-294547 and 6-331979.

There is still further proposed a compensating plate for use in an LCD constituted of a liquid crystalline polymer film having a twist/tilt orientation, which is used for broadening of a viewing angle of the LCD.

As mentioned above, while progress in development of an LCD of a TN type which has a feature of a broad viewing angle has been conspicuous in these days, a liquid crystal display device having a sufficient performance has not been obtained yet.

OBJECT OF THE INVENTION

The present invention is made to solve the above mentioned problems and to provide a liquid crystal device having a wide viewing angle, which has not conventionally been available, by disposing a liquid crystal cell of a TN type for driving and a specific compensating film in specific conditions.

SUMMARY OF THE INVENTION

A first aspect of the present invention is concerned with a liquid crystal display device comprising a liquid crystal cell of a TN type for driving sandwiched by a pair of upper and lower polarizing plates in which: at least one compensating film, which is essentially constituted of a liquid crystalline polymer which optically shows a positive uniaxiality and which is fixed in a nematic hybrid orientational order, is inserted between the liquid crystal cell and the upper polarizing plate, or between the liquid crystal cell and the lower polarizing plate, or at least two compensating films, each of which is essentially constituted of a liquid crystalline polymer which optically shows a positive uniaxiality and which is fixed in a nematic hybrid orientational order, are respectively inserted between the liquid crystal cell and the upper polarizing plate, and between the liquid crystal cell and the lower polarizing plate; and an angle between a tilt direction of a compensating film and a pretilt direction on a liquid crystal cell substrate opposed to a substrate for the liquid crystal cell for driving closest to the compensating film is in the range of 165 to 195 degrees.

A second aspect of the present invention is concerned with a liquid crystal display device according to the first aspect of the present invention, wherein a structure of the upper polarizing plate/compensating film/liquid crystal cell for drive/compensating film/lower polarizing plate is formed.

A third aspect of the present invention is concerned with a liquid crystal display device according to any of the first and second aspects of the present invention, wherein the liquid crystalline polymer which optically shows a positive uniaxiality is a liquid crystalline polymer compound of a homeotropic alignment, one end or both ends of whose polymer chain have a monofunctional structure unit, or a liquid crystalline polymer composition comprising at least one liquid crystal polymer compound of a homeotropic alignment, one end or both ends of whose polymer chain have a monofunctional structure unit.

DETAILED DESCRIPTION OF THE DRAWINGS

DETAILED DESCRIPTION OF THE INVENTION

The present invention will be described in detail:

A twisted nematic liquid crystal display device of the present invention is fabricated by inserting at least one compensating film, which is essentially constituted of a liquid crystalline polymer which optically shows a positive uniaxiality and which is fixed in a nematic hybrid orientational order, between the liquid crystal cell and the upper polarizing plate, or between the liquid crystal cell and the lower polarizing plate, or at least two compensating films, each of which is essentially constituted of a liquid crystalline polymer which optically shows a positive uniaxiality and which is fixed in a nematic hybrid orientational order, respectively between the liquid crystal cell and the upper polarizing plate, and between the liquid crystal cell and the lower polarizing plate in conditions as described below.

Figure 1:
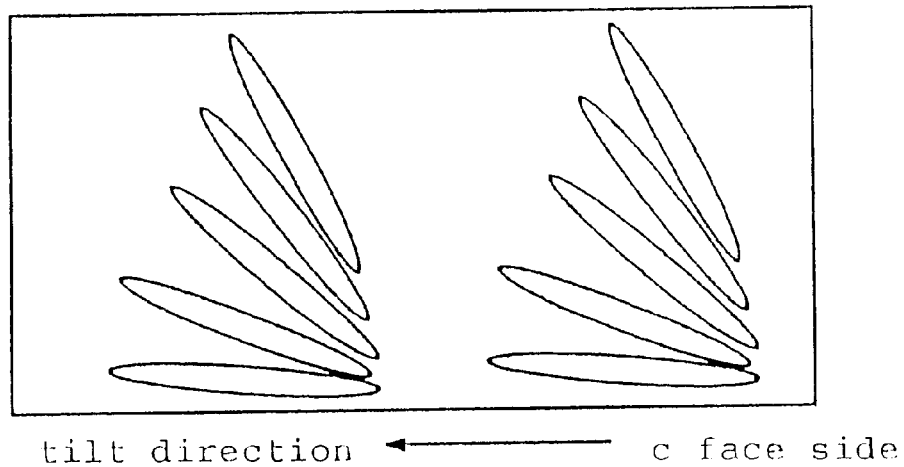
FIG. 1 is a representation illustrating a conception of a tilt direction in the present invention.

Herein, a direction of tilt of a compensating film in the present invention is defined as a direction of a projection of a director of the liquid crystalline polymer molecule on the upper or lower surfaces of the film to whichever an angle of the director of the liquid crystalline polymer is smaller. In a concrete manner, for example it is assumed in FIG. 1 that an upper and the lower surfaces are indicated by a b plane and c plane. In the compensating film, angles between a director of the liquid crystalline polymer and a film surface on the b plane side, and that on the c plane side have a relation that an angle on the b plane side is larger than an angle on the c plane side. When the c plane of the compensating film is viewed from the b plane of the compensating film along a thickness direction, a sense of tilt of the compensating film in the present invention is defined as a sense of a direction, along which respective directors in the b and c plane sides form a narrower angle, and which is parallel to projections on a film surface of directors in the b plane and the c plane sides. The direction of tilt and a direction of pretilt on the c plane side coincide with each other.

Figure 2:
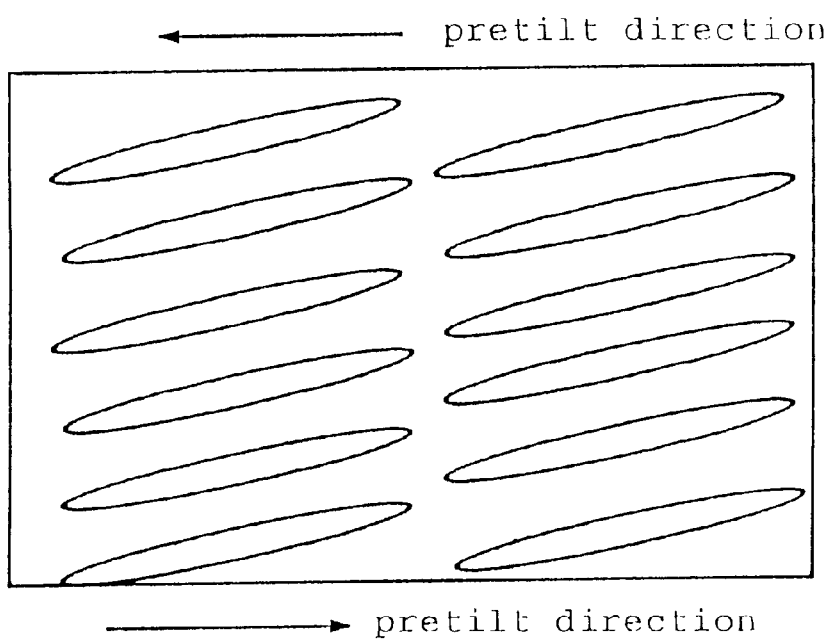
FIG. 2 is a representation illustrating a conception of a pretilt direction in the present invention.

A direction of pretilt of a liquid crystal cell for driving is defined as follows. Generally, as shown in FIG. 2, a low molecular weight liquid crystal in a liquid crystal cell is not parallel to a boundary of a cell substrate but is inclined to the boundary at an angle (when a twist angle of the low molecular weight liquid crystal is 0 degree). In this condition, a direction of pretilt in the present invention is defined as a direction, along which a director of the low molecular weight liquid crystal and a surface of the liquid crystal cell substrate form a narrower angle, and which is parallel to a projection of the director of the low molecular weight liquid crystal. Therefore, directions of pretilt are respectively defined for the upper and lower substrates of the liquid crystal cell for driving as shown in FIG. 2.

In the present invention, a liquid crystal display is obtained by inserting at least one compensation film between an upper polarizing plate and a liquid crystal cell for driving or between the lower polarizing plate and the liquid crystal cell for driving, or at least two compensating films between an upper polarizing plate and the liquid crystal cell for driving, and between the lower polarizing plate and the liquid crystal cell for driving on the basis of the above mentioned definitions. At this point, it is preferable that one or two compensating films are used. While a liquid crystal display of the present invention can also be obtained with use of three or more compensating films, such a liquid crystal display is not practically costwise.

First of all, the case where one compensating is inserted will be described. The compensating film is inserted between a polarizing plate and a liquid crystal cell for driving and the insertion may be either on the upper side of the liquid crystal cell or the lower side thereof. In configuration, the compensating film is disposed such that a tilt direction of the compensating film and a pretilt direction on a cell substrate opposed to a substrate of the liquid crystal cell for driving closest to the compensating film forms generally an angle in the range of 165 to 195 degrees, preferably 170 to 190 degrees or especially preferably 175 to 185 degrees. That is, the configuration is such that when the compensating film is placed on the upper surface of the liquid crystal cell, an angle between the tilt direction and the pretilt direction on the lower substrate of the liquid crystal cell satisfies the above mentioned angle range condition, or when the compensating film is placed on the lower surface of the liquid crystal cell, an angle between the tilt direction and the pretilt direction on the upper substrate of the liquid crystal cell satisfies the above mentioned angle range condition. Unless the above mentioned angle range conditions are satisfied, a sufficient compensation effect of a viewing angle cannot be attained.

Then, the case where two compensating films are inserted will be described. In configuration including two compensating films, the two films maybe inserted in the same side, for example either between the liquid crystal cell and the upper polarizing plate or between the liquid crystal cell and the lower polarizing plate. Instead, the two compensating films may respectively be inserted between the liquid crystal cell and the upper polarizing plate, and between the liquid crystal cell and the lower polarizing plate. The two compensating films may be of the same optical parameter or may be different in optical parameter from each other.

Described will be the case where two compensating films are respectively inserted between the upper polarizing plate and the liquid crystal cell for driving, and between the lower polarizing plate and the liquid crystal cell for driving. In the configuration, the two compensating films are respectively disposed in a similar way to that in the case where one compensating film is disposed. That is, each compensating film is disposed such that a tilt direction of the compensating film and a pretilt direction on a cell substrate opposed to a substrate of the liquid crystal cell for driving to which the compensating film is adjacent form an angle generally in the of 165 to 195 degrees, preferably 170 to 190 degrees or especially preferably 175 to 185 degrees.

Described will be the case where two compensating films are both inserted either between the liquid crystal cell for driving and the upper polarizing plate or lower polarizing plate. A compensating film locating at a position closest to the liquid crystal cell for driving is designated as a film 1 and the other compensating film which is placed either between the film 1 and the upper polarizing plate or lower polarizing plate is designated a film 2. In the configuration, the film 1 which is located at the closest position to the liquid crystal cell is disposed in a similar condition to that in the case of use of one compensating film. That is, the film 1 is disposed such that a tilt direction of the film 1 and a pretilt direction on a cell substrate opposed to a substrate of the liquid crystal cell for driving form an angle generally in the range of 165 to 195 degrees, preferably 170 to 190 degrees or especially preferably 175 to 185 degrees. Described will be arrangement of the film 2, which is inserted either between the film 1 and the upper polarizing plate or lower polarizing plate. The film 2 is disposed such that a tilt direction of the film 2 and a pretilt direction on a cell substrate of the liquid crystal cell to which the film 1 is closest, in other words, a pretilt direction on a transparent substrate other than the transparent substrate which is used as a reference in arrangement of the film 1 form an angle generally in the range of 165 to 195 degrees, preferably 170 to 190 degrees or especially preferably 175 to 185 degrees.

Described will be arrangement of polarizing plates. Generally, in a TN-LCD, there are cases where transmission axes of upper and lower polarizing plates are orthogonal or parallel to each other. In the case where the transmission axes of upper and lower polarizing plates are orthogonal to each other, there are still the cases where a transmission axis of a polarizing plate and a rubbing direction of a liquid crystal cell for driving in the cell side closer to the polarizing plate intersect each other at an angle of 90 degrees or 45 degrees, or are parallel to each other. When a polarizing plate is placed on a polarizing plate in a liquid crystal display device of the present invention, the arrangement of a polarizing plate is not specific but any of the above mentioned arrangements may be adopted. Among them, in a liquid crystal display of the present invention, desirable is such configurations that transmission axes of the upper and lower polarizing plates are orthogonal to each other, and a transmission axis of a polarizing plate and a rubbing direction of the liquid crystal cell in the cell side closer to the polarizing plate are orthogonal or parallel to each other.

Described will be a compensating film which is used for a liquid crystal display device of the present invention. The compensating film is formed essentially of liquid crystalline polymer, which optically shows a positive uniaxiality, and which has a phase obtained by fixing a nematic hybrid orientational state which a liquid crystal forming polymer forms in a liquid crystalline state.

A nematic hybrid orientational order herein in the present invention is an orientational state that a liquid crystalline polymer has a nematic alignment order, wherein the director of a liquid crystalline polymer to upper or lower surfaces of the film form angles different from each other in the respective surface sides. Therefore, angles between the director and the upper or lower film surface are different from each other, which can be said in other words that an angle of a director changes between the upper and lower surfaces of the film in a continuous manner. Since the compensating film used in the present invention is a film obtained by fixing a nematic hybrid orientational state of a liquid crystalline polymer which has a positive uniaxiality, a director of a liquid crystalline polymer is not directed at the same angle at any depth along a thickness direction of the film. For this reason, the compensating film has no optical axis when viewed as a structural body called a film.

Upper and lower surfaces of a film having such a nematic hybrid structure are not optically equivalent. Therefore, when the film is disposed in a liquid crystal cell for driving according to the arranging conditions described above, there arises some difference in broadening effect of a viewing angle between arrangements of which surface of the film is disposed on the liquid crystal cell side, upper or lower. In the arrangement conditions of the present invention, though sufficient broadening effect of a viewing angle can be attained in either of both arrangements, a condition is preferable that an upper or lower surface of the compensating film, to whichever an angle of a director of a liquid crystalline polymer is smaller, is disposed at the closest position to the liquid crystal cell for driving.

Described will be a variety of parameters of a compensating film used in the present invention.

A thickness of a compensating film is generally in the range of 0.1 to 20 $\mu$m, preferably 0.2 to 10 $\mu$m or especially preferably 0.3 to 5 $\mu$m. If it is smaller than 0.1 $\mu$m, there is a fear that sufficient compensation effect cannot be obtained. If it is larger than 20 $\mu$m, there is a fear that a screen display is colored in an unnecessary manner.

Described will be an apparent retardation in a surface of the compensating film when being viewed along a direction normal to the film. In a film with a nematic hybrid orientational order, a refractive index in a direction parallel to a director in a film surface (hereinafter referred to as ne) and a refractive index in a direction perpendicular to the director (hereinafter referred to as no) are different form each other. When a remainder of subtraction of ne minus no is an apparent birefringence, an apparent retardation value is given by a product between an apparent birefringence and an effective thickness. This apparent retardation value can be obtained by an optical measurement on polarization using an ellipsometry with ease. The apparent retardation value of the compensating film for monochromatic light of wavelength of 550 nm is generally in the range 5 to 500 nm, preferably 10 to 300 nm, especially preferably 15 to 150 nm. If it is smaller than 5 nm, there is a fear that a sufficient broadening effect of a viewing angle cannot be obtained. If it is larger than 500 nm, there is a fear that an unnecessary coloring arises in a screen display.

Described will be director angles at upper and lower surfaces of the compensating film. An angle of a director is generally in the range of 60 to 90 degrees or preferably 80 to 90 degrees in absolute value in the vicinity of one of the upper and lower boundary surfaces and in the vicinity of the other surface, generally in the range of 0 to 50 degrees or preferably 0 to 30 degrees in absolute value.

Described will be an average tilt angle of the compensating film.

In the present invention, an average of angles of directors of a liquid crystalline polymer to a substrate surface along a thickness direction is defined as an average tilt angle. An average tilt angle can be obtained by application of a crystal rotation method. An average tilt angle of a compensating film used in the present invention is generally in the range of 10 to 60 degrees or preferably 20 to 50 degrees. If it is outside the range, there is a fear that a sufficient broadening effect of a viewing angle cannot be attained.

A compensating film used in the present invention is not restrictive as far as it has the nematic hybrid orientational structure and the parameters in the respective ranges.

In a more detailed manner, described will be a compensating film used in the present invention. The compensating film is essentially made of liquid crystalline polymer optically showing a positive uniaxiality. The liquid crystalline polymer e is in a concrete manner a liquid crystalline polymer compound of a homeotropic alignment or a liquid crystalline polymer composition comprising at least one of liquid crystalline polymer compounds each of a homeotropic alignment.

A homeotropic orientational order is a state of a liquid crystal that a director of a liquid crystal is aligned along a direction almost normal to a substrate surface. A liquid crystalline polymer is an indispensable constituent for realization of a nematic hybrid orientational order.

Determination of whether or not liquid crystalline polymer molecules are of a homeotropic alignment is performed by determining an orientational state after a liquid crystalline polymer layer is formed on a substrate. As a substrate which can be used for the determination, there is no specific condition for selection and there can be named: optical glasses such as soda glass, potassium glass, borosilicated glass, crown glass, flint glass and the like; and plastic films or sheets which has heat resistance at a liquid crystalline phase temperature of a liquid crystalline polymer, a more concrete manner, such as polyethyleneterephthalate, polyethylenenaphthalate, polyphenyleneoxide, polyphenylenesulfide, polyimide, polyamideimide, polyetherimide, polyamide, polyetherketone, polyetheretherketone, polyketonesulfide, polyethersulfone, polyarylate and the like. The substrates exemplified above are used after cleaning a surface with an acid, alcohols, surfactants and the like, but a surface treatment such as a silicone treatment or the like is not conducted before the use.

A liquid crystalline polymer of a homeotropic alignment here in the present invention is defined as a polymer which is fabricated in a manner such that a liquid crystal forming polymer film is formed on one of the substrates which are exemplified above and the polymer assumes a homeotropic orientational order at a temperature at which the liquid crystal forming polymer shows a liquid crystalline state. There is a liquid crystal forming polymer which is aligned in a peculiar way at a temperature in the vicinity of a liquid crystalline/isotropic phase transition temperature according to a kind or a composition of the polymer. Therefore, alignment is preferably conducted at a temperature lower than the liquid crystalline/isotropic phase transition temperature by 15° C. or more, or preferably 20° C. or more.

As a liquid crystal forming polymer of a homeotropic alignment, there are named, for example, 1) a liquid crystal forming polymer having; an aromatic group having a bulky substituent in its structural unit constituting a main chain thereof, an aromatic group having a long chain alkyl group, and an aromatic group having a fluorine atom and the like; and 2) a liquid crystal forming polymer having a monofunctional structural unit which is derived from a compound having: a long chain alkyl group of the carbon number of 3 to 20, a long chain fluoroalkyl group of the carbon number of 2 to 20 or the like; and one of functional portions such as monoalcohol, a mono-carboxylic acid and the like at one end or both ends of its liquid crystal forming polymer chain.

A monofunctional structural unit used in the above a liquid crystal forming polymer 2) is a structure that a monomer having one functional group corresponding to a functional group of a di-functional monomer used in formation of a condensation polymer, which is a liquid crystal forming polymer, is incorporated in the condensation polymer by adding the monomer having one functional group to a reaction mixture in fabrication of the condensation polymer (during a polymerization reaction or after the reaction) and the monomer or monomers are generally attached at one or both of the ends of a molecule of the condensation polymer. Therefore, the number of the monofunctional structural unit present in the condensation polymer generally is in the range of 1 to 2 per molecule.

The monofunctional structural unit is expressed in the following general formula.

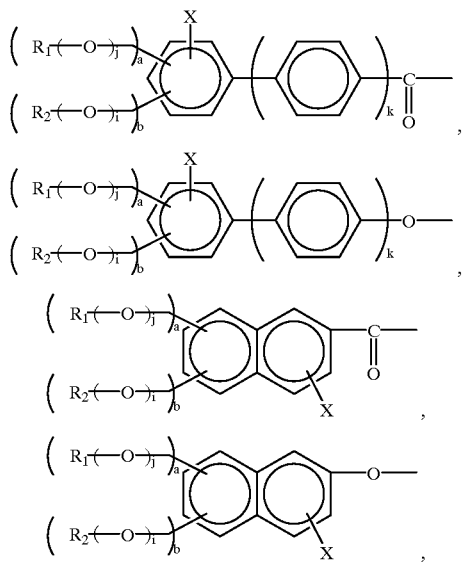

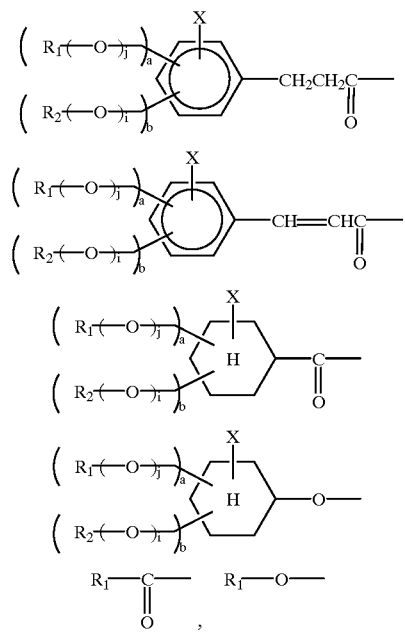

In the general formulas described above, $R_1$ and $R_2$ may be the same or different; $R_1$ and $R_2$ each represent a long-chain $C_{(3-20)}$ alkyl or a long-chain $C_{(2-20)}$ fluoroalkyl group; preferable examples of which include $CH_3CH_2CH_2$—, $C_3CH(CH_3)CH_2$—,
$C(CH_3)_3$—, $(CH_3)_2CH$—, $CH_3(CH_2)_3$—, $C_5H_{11}$—,
$C_9H_{19}$—, $C_6H_{13}$—, $C_8H_{17}$—, $C_7H_{15}$—, $C_{10}H_{21}$—,
$C_{12}H_{25}$—, $C_{14}H_{29}$—, $C_{18}H_{37}$—, $C_{16}H_{33}$—, $C_{20}H_{41}$—,
$CF_3CH_2$—, $CF_3CF_2$—, $(CF_3)_2CF$—,
$(CF_3)_2CF(CF_2)_2$—, $C_6F_{13}$—, $C_8F_{17}$—,
$CF_3(CF_2)_3CH_2CH_2$—, $(CF_3)_2CF(CF_2)_8$—,
$CHF_2CF_2CH_2$—, $CF_3CH_2CH_2$—,
$(CF_3)_2CF(CF_2)_8CH_2CH_2$—,
$CF_3(CF_2)_7CH_2CH_2$—, $H(CF_2)_4CH_2$—,
$CF_3(CF_2)_9CH_2CH_2$—, $CF_3(CF_2)_3(CH_2)_6$—,
$CF_3CF_2(CF_2)_6$—, $CHF_2CF_2CH_2$—,
$CF_3(CF_2)_5CH_2CH_2$—, $H(CF_2)_6CH_2$—,
$H(CF_2)_4CH_2$—, $H(CF_2)_8CH_2$—, and the like; X represents halogen such as fluorine and chlorine or the like; i is 0 or 1; j is 0 or 1; k is 0 or 1; a is 0 or 1, b is 0 or 1, provided a+b≠0.

Preferable examples of $R_1$ and $R_2$ include the following groups.

Preferable examples of the monofunctional structural unit produced from the monohydric alcohol, monocarboxylic acid and a functional derivative of these compounds include the following units,

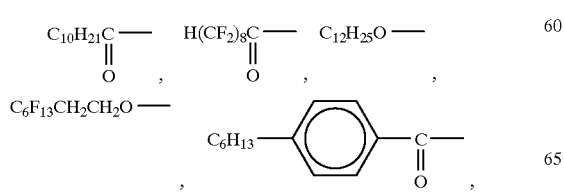

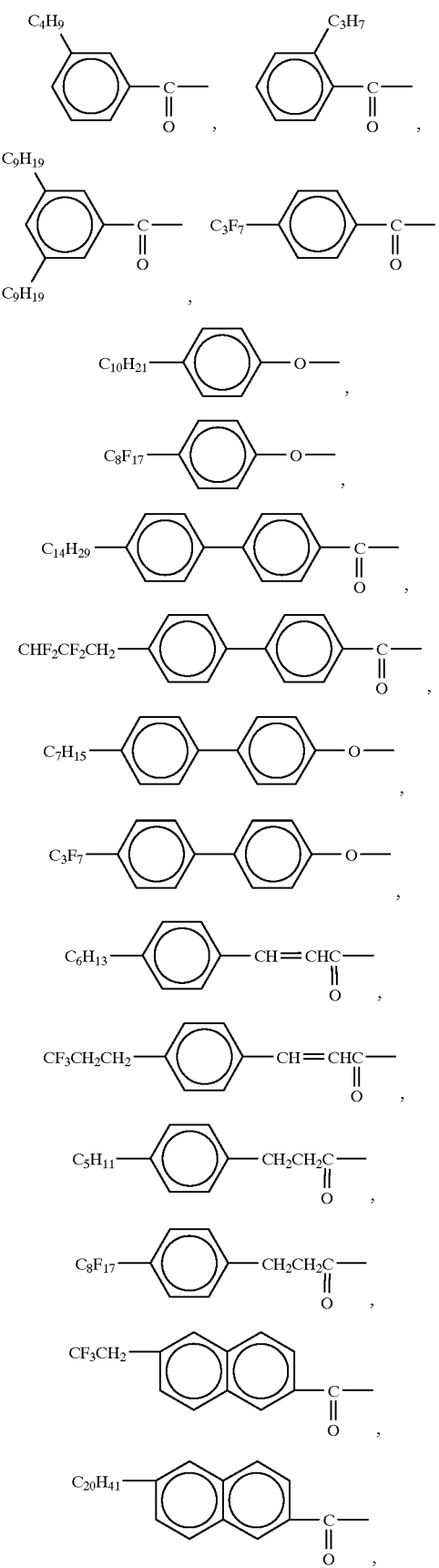

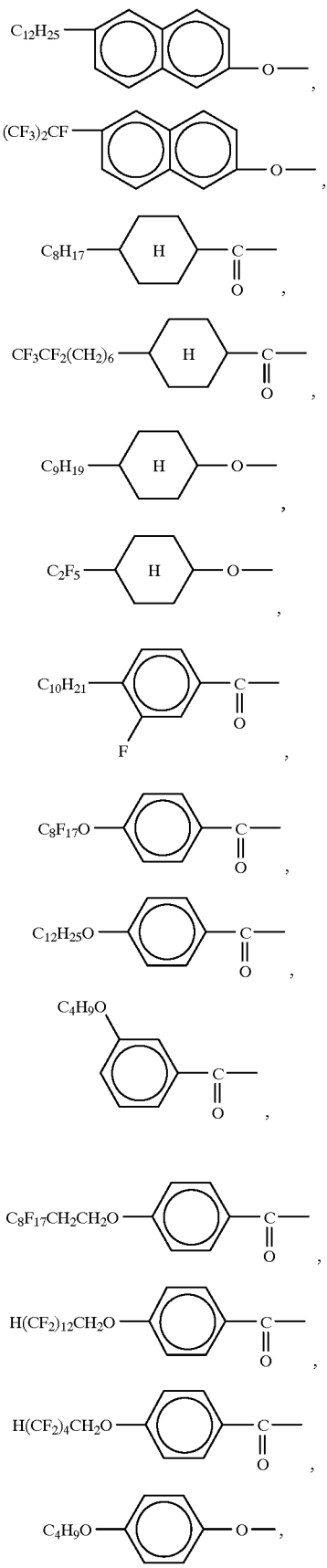
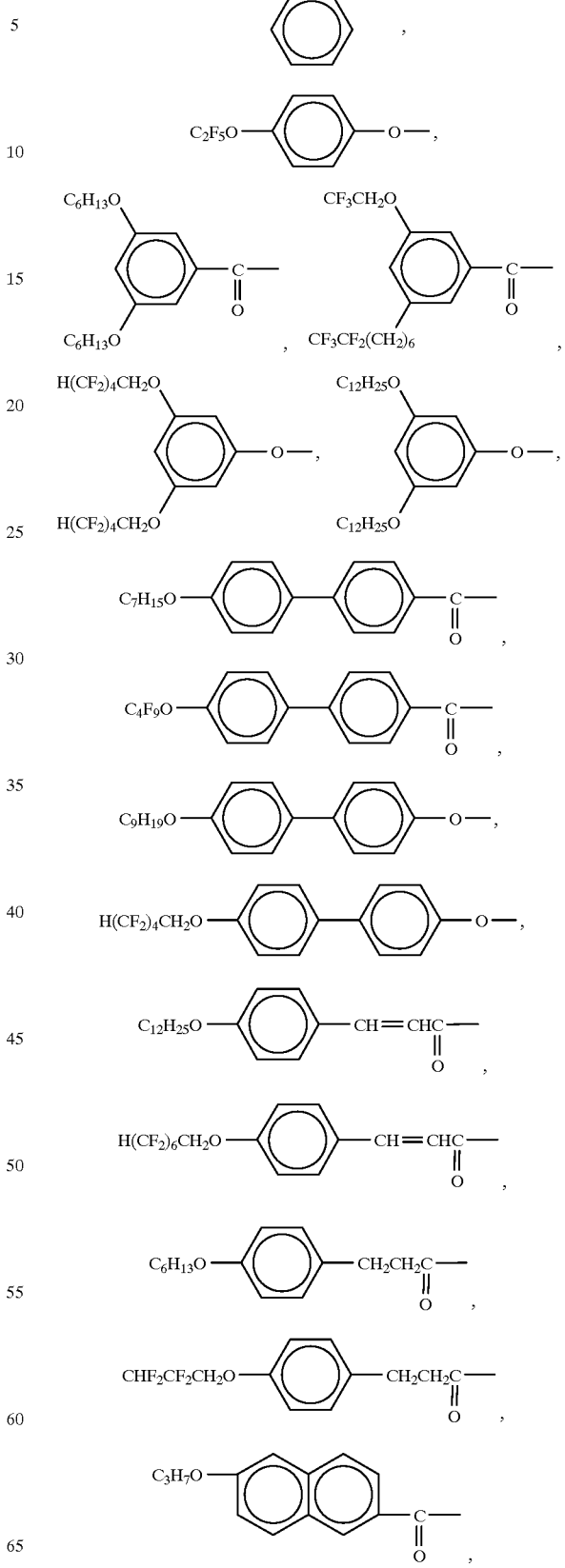

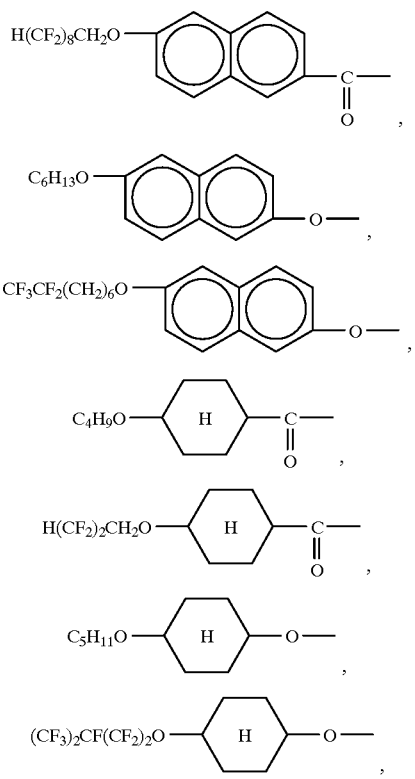

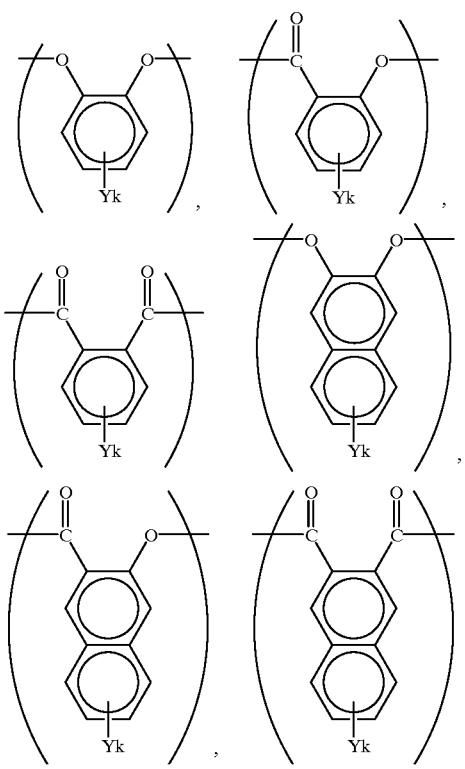

One or two units selected from the above-described monofunctional structural units constitute one end or both ends of a polymer chain. In the case where the polymer chain has the structural units at both ends of the chain, the structural units do not need to be the same.

Typical examples of the liquid crystalline polymer are main chain type liquid crystalline polymers such as polyesters, polyimides, polyamides, polycarbonates and polyester-insides which meet the above conditions ① and/ or ②. Among then, liquid crystalline polyesters are preferable interms of, for example, ease in synthesis, ease in making films and stability of the physical properties of the films obtained. Generally, the main chain of the liquid crystalline polyester comprises bifunctional structural units, such as dicarboxylic acid units, diol units and oxycarboxylic acid units, and also polyfunctional structural units other than the bifunctional structural units.

The liquid crystalline polyester preferably used for preparing the compensating film in the present invention are those having an ortho-substituted aromatic unit in the main chain.

Examples of these structural units include a catechol unit, a salicylic acid unit, a phthalic acid unit, a 2,3-naphthalenediol unit, a 2,3-naphthalenedicarboxylic acid unit and any of the foregoing units having a substituent on the benzene ring;

where Y is selected froni the group consisting of hydrogen, halogen such as Cl and Br, methyl, ethyl, methoxy, ethoxy and phenyl groups; and k is 0 to 2.

Examples of the structure of the liquid crystalline polyester which exhibits a homeotropic orientation and which satisfies the above conditions ① and ② are given below.

Those satisfying the condition ①:

Structural Formula 1

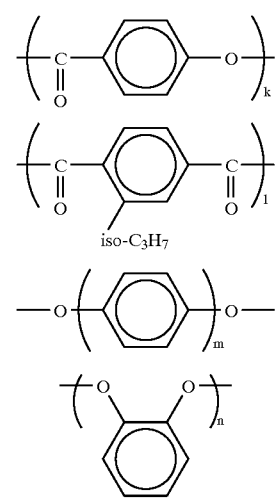

where $1=m+n$, $k/1=20/10\sim0/10$, preferably $15/10\sim0/10$, $n/m=100/0\sim20/80$, preferably $98/2\sim30/70$, and k, l, m and n represent, respectively, a molar ratio.

Structural Formula 2

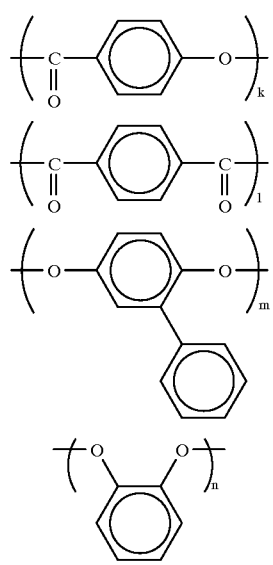

where l=m+n, k/l=20/10~0/10, preferably 15/10~0/10, m/n=100/0~1/99, preferably 90/10~2/98, and k, l, m and n represent, respectively, a molar ratio.

Structural Formula 3

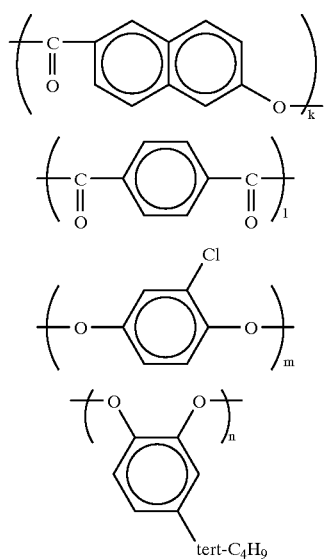

where l=m+n, k/l=20/10~0/10, preferably 15/10~0/10, n/m=100/0~1/99, preferably 90/10~2/98, and k, l, m and n represent, respectively, a molar ratio.

Structural Formula 4

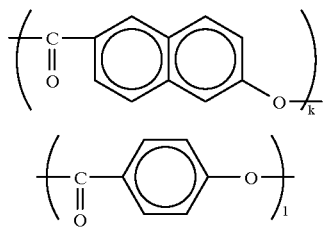

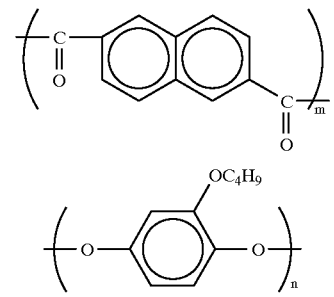

where m=n, (k+l)/m=20/10~2/10, preferably 15/10~5/10, k/l=100/0~0/100, preferably 95/5~5/95, and k, l, m and n represent, respectively, a molar ratio.

Structural Formula 5

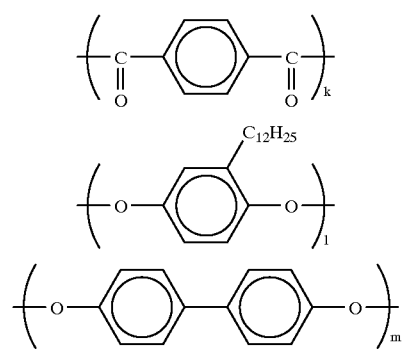

where k=m+n, l/m=100/0~1/99, preferably 0/10~2/98, and k, l and m represent, respectively, a molar ratio.

Structural Formula 6

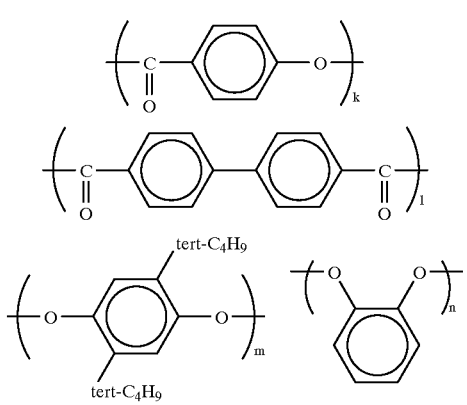

where l=m+n, k/l=20/10~0/10, preferably 15/10~0/10, m/n=100/0~1/99, preferably 90/10~2/98, and k, l, m and n represent, respectively, a molar ratio.

Structural Formula 7

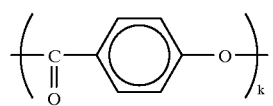

-continued

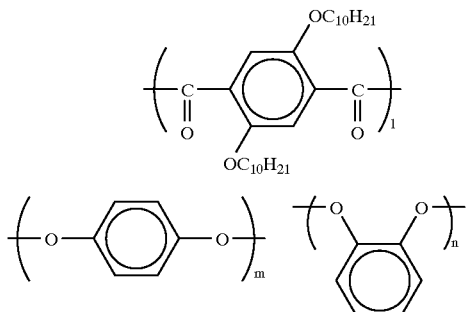

where l=m+n, k/l=20/10~0/10, preferably 15/10~0/10, m/n=100/0~0/100, preferably 95/5~5/95, and k, l, m and n represent, respectively, a molar ratio.

Structural Formula 8

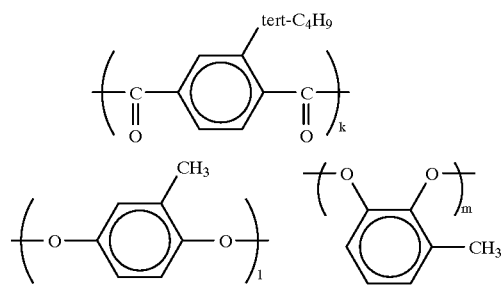

where k=l+m, l/m=100/0~0/100, preferably 95/5~5/95, and k, l, m and n represent, respectively, a molar ratio.

Structural Formula 9

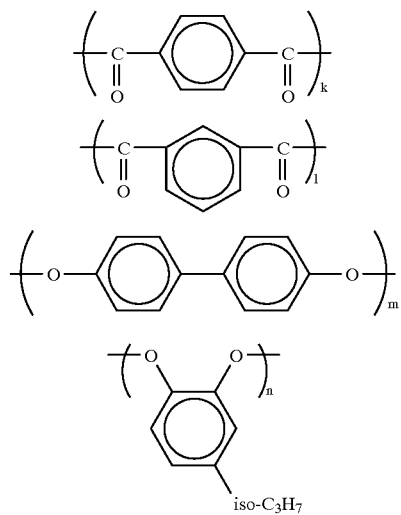

where k+l=m+n, k/l=100/0~0/100, preferably 95/5~5/95, n/m=100/0~1/99, preferably 90/10~2/98, and k, l, m and n represent, respectively, a molar ratio.

Structural Formula 10

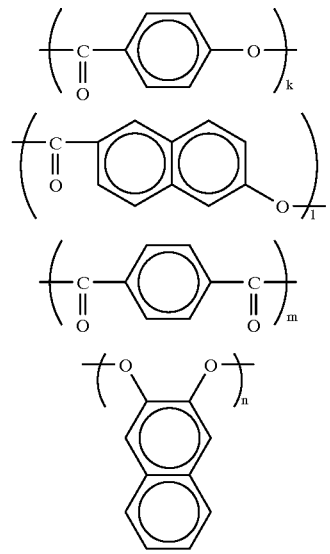

where m=n, (k+l)/m=20/10~2/10, preferably 5/10~5/10, and k, l, m and n represent, respectively, a molar ratio.

Structural Formula 11

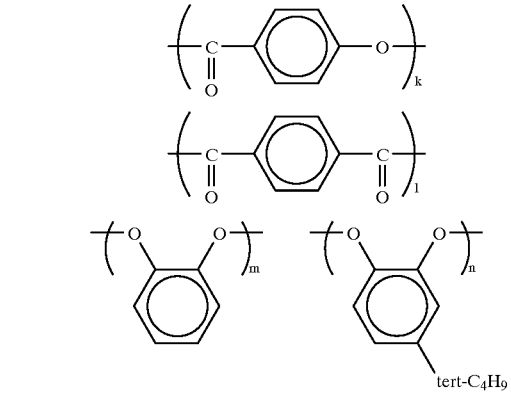

where l=m+n, k/l=20/10~0/10, preferably 15/10~0/10, n/m=100/0~1/99, preferably 90/10~2/98, and k, l, m and n represent, respectively, a molar ratio.

Structural Formula 12

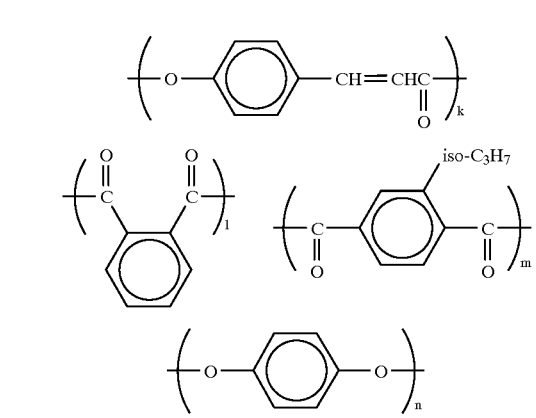

where n=m1, k/n=20/10~0/10, preferably 15/10~0/10, m/l=100/0~1/99, preferably 90/10~2/98, and k, l, m and n represent, respectively, a molar ratio.

Structural Formula 13

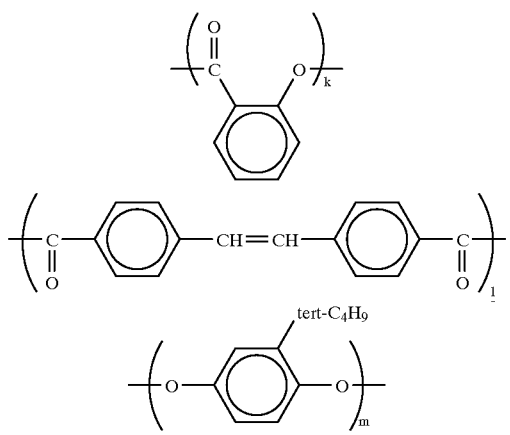

where l=m, k/l=20/10~0/10, preferably 15/10~0/10, and k, l, and m represent, respectively, a molar ratio.

Structural Formula 14

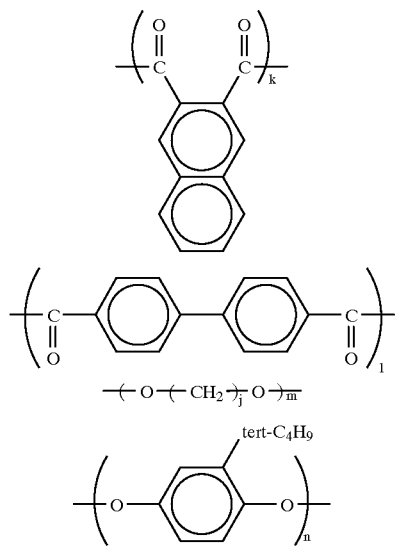

where k+l=m+n, k/l=100/0~0/100, preferably 95/5~5/95, m/n=100/0~0/100, preferably 95/5~5/95, and k, l, m and n represent, respectively, a molar ratio, and j is an integer of 2–12.

Structural Formula 15

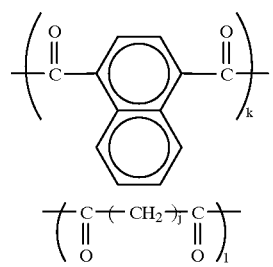

-continued

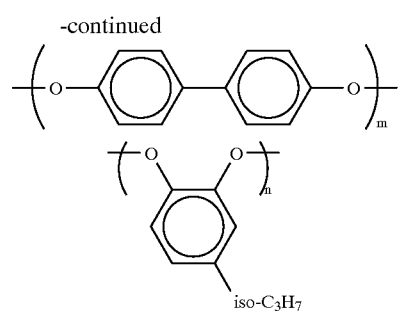

where k+l=m+n, k/l=100/0~0/100, preferably 95/5~5/95, m/n=100/0~0/100, preferably 95/5~5/95, and k, l, m and n represent, respectively, a molar ratio, and j is an integer of 2–12.

Structural Formula 16

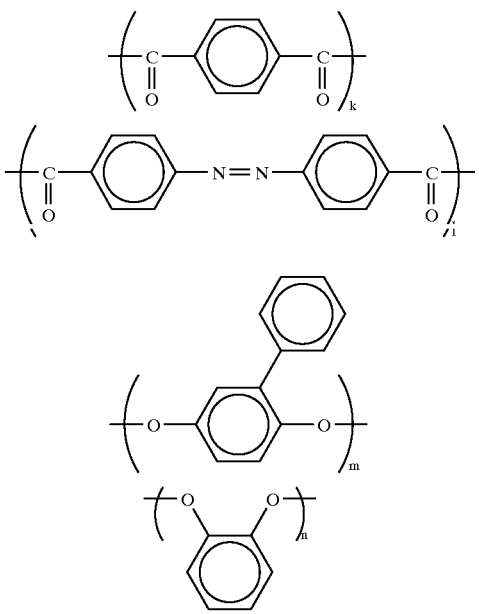

where k+l=m+n, k/l=100/0~0/100, preferably 95/5~5/95, m/n=100/0~1/99, preferably 90/10~2/98, and k, l, m and n represent, respectively, a molar ratio.

Structural Formula 17

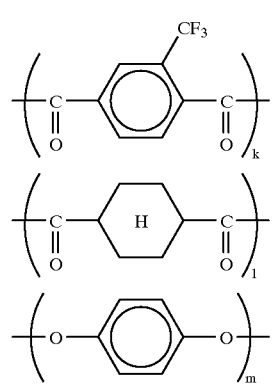

-continued

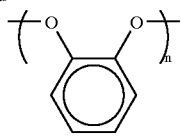

where k+l=m+n, k/l=100/0~1/99, preferably 90/10~2/98, m/n=100/0~0/100, preferably 95/5~5/95, and k, l, m and n represent, respectively, a molar ratio.
Structural Formula 18

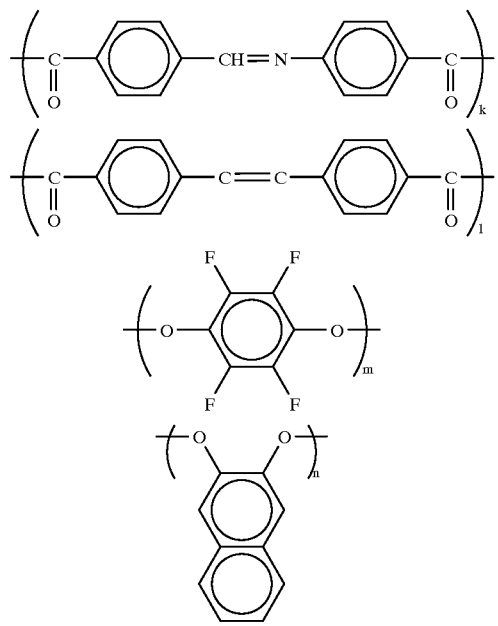

where k+l=m+n, k/l=100/0~0/100, preferably 95/5~5/95, m/n=100/0~1/99, preferably 90/10~2/98, and k, l, m and n represent, respectively, a molar ratio.
Structural Formula 19

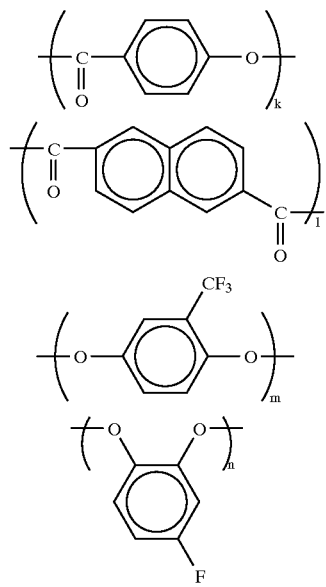

where l=m+n, k/l=20/10~0/10, preferably 15/10~0/10, m/n=100/0~0/100, preferably 95/5~5/95, and k, l, m and n represent, respectively, a molar ratio.

Structural Formula 20

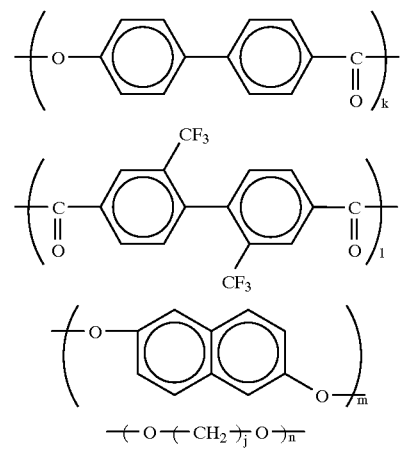

where l=m+n, k/l=20/10~0/10, preferably 15/10~0/10, m/n=100/0~0/100, preferably 95/5~5/95, and k, l, m and n represent, respectively, a molar ratio, and j is an integer of 2 12.

Structural Formula 21

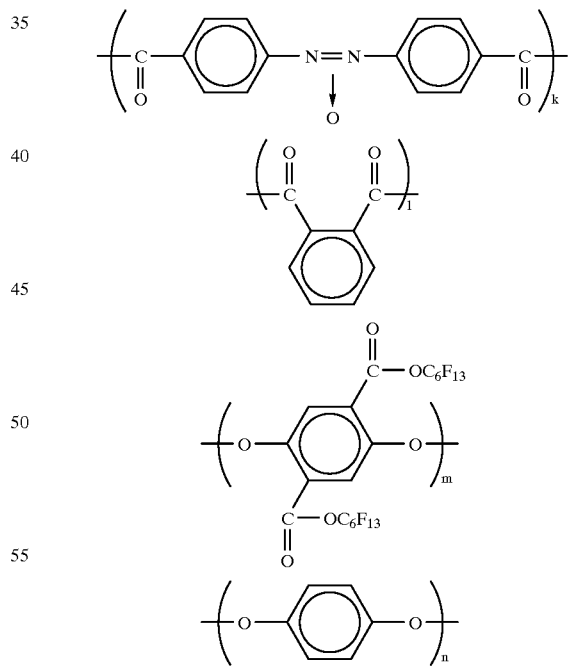

where k+l=m+n, k/l=100/0~0/100, preferably 95/5~5/95, m/n=100/0~1/99, preferably 90/10~2/98, and k, l, m and n represent, respectively, a molar ratio.

Those satisfying the condition ②:

Structural Formula 22

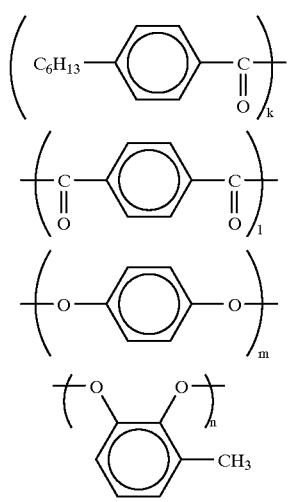

where m+n=k/2+l k/l=80/60~2/99, preferably 40/80~10/95 m/n=100/0~0/100, preferably 95/5~5/95, and k, l, m and n represent, respectively, a molar ratio.

Structural Formula 23

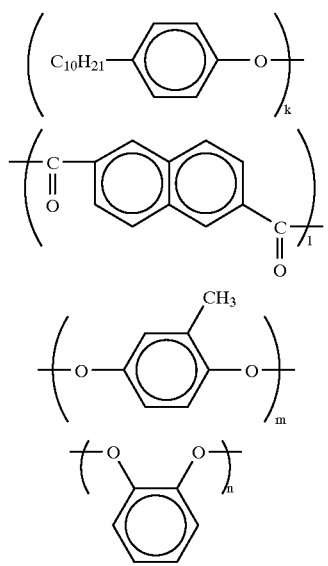

where l=k/2+m+n k/(m+n)=80/60~2/99, preferably 40/80~10/95 m/n=100/0~0/100, preferably 95/5~5/95, and k, l, m and n represent, respectively, a molar ratio.

Structural Formula 24

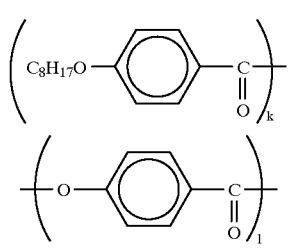
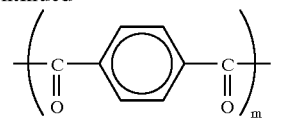
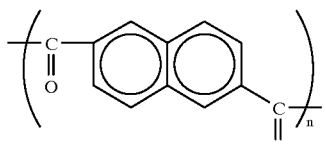
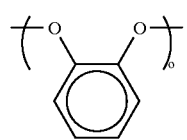

where o=k/2+m+n k/(m+n)=80/60~2/99, preferably 40/80~10/95 m/n=100/0~0/100, preferably 95/5~5/95, l/o= 20/10~0/10, preferably 15/10~5/10, and k, l, m, n and o represent, respectively, a molar ratio.

Structural Formula 25

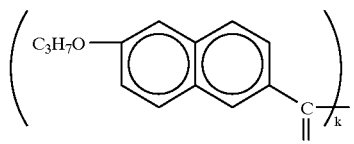
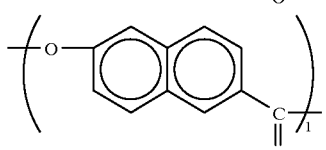
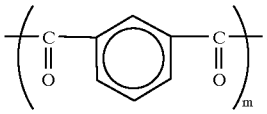
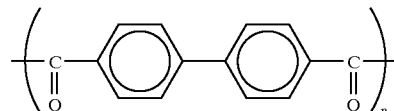
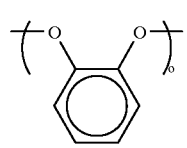

where o=k/2+m+n k/(m+n)=80/60~2/99, preferably 40/80~10/95 m/n=100/0~0/100, preferably 95/5~5/95, l/o= 20/10~0/10, preferably 15/10~5/10, and k, l, m, n and o represent, respectively, a molar ratio.

Structural Formula 26

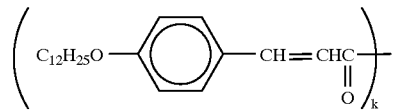

-continued

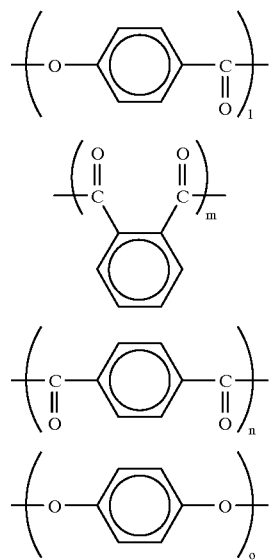

where o=k/2+m+n  k/(m+n)=80/60~2/99, preferably 40/80~10/95 m/n=100/0~0/100, preferably 95/5~5/95, l/o=20/10~0/10, preferably 15/10~5/10, and k, l, m, n and o represent, respectively, a molar ratio.

Structural Formula 27

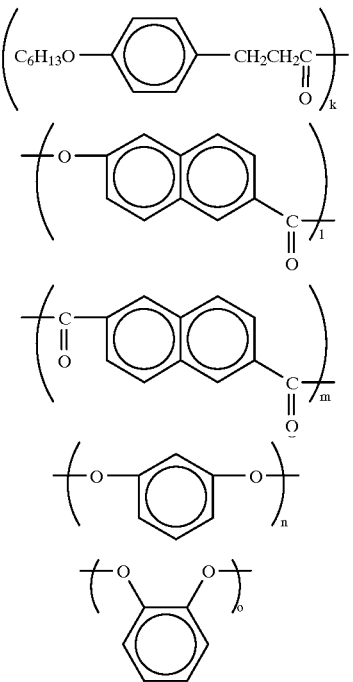

where n+o=k/2+m  k/m=80/60~2/99, preferably 40/80~10/95 n/o=100/0~0/100, preferably 95/5~5/95, l/(n+o)=20/10~0/10, preferably 15/10~5/10, and k, l, m, n and o represent, respectively, a molar ratio.

Structural Formula 28

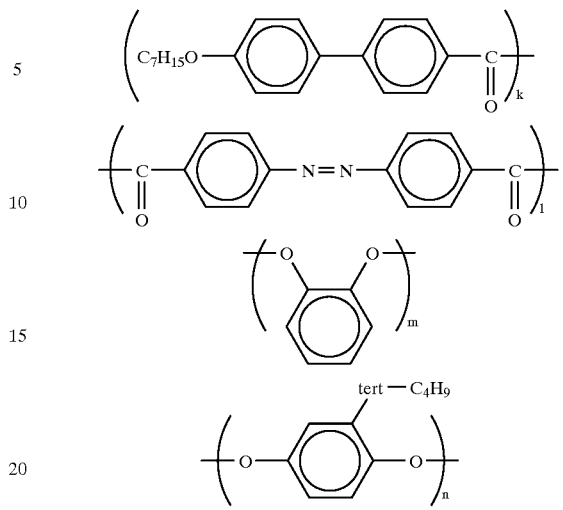

where m+n=k/2+l  k/l=80/60~2/99, preferably 40/80~10/95 m/n=100/0~0/100, preferably 95/5~5/95, and k, l, m and n represent, respectively, a molar ratio.

Structural Formula 29

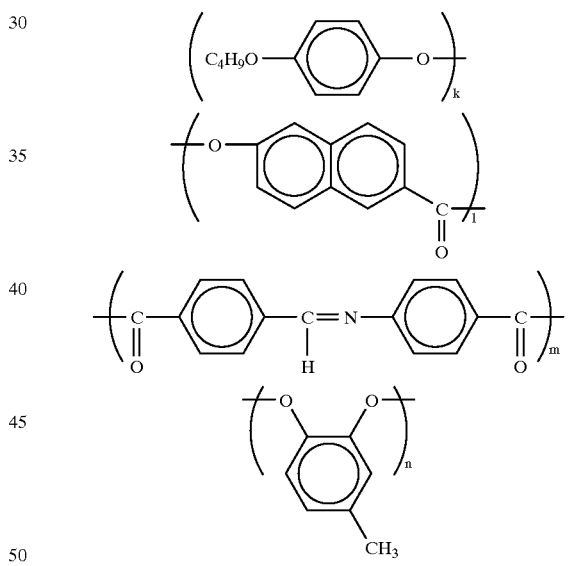

where m=k/2+l  k/n=80/60~2/99, preferably 40/80~10/95 l/m=20/10~0/10, preferably 15/10~5/10, and k, l, m and n represent, respectively, a molar ratio.

Structural Formula 30

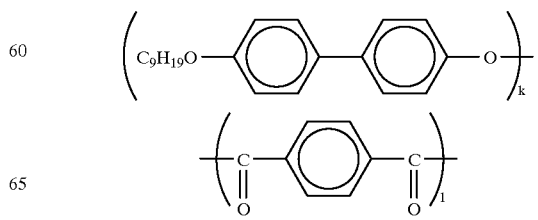

27

-continued

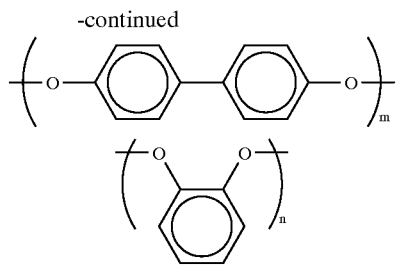

where l=k/2+m+n k/(m+n)=80/60~2/99, preferably 40/80~10/95 m/n=100/0~0/100, preferably 95/5~5/95, and k, l, m and n represent, respectively, a molar ratio.

Structural Formula 31

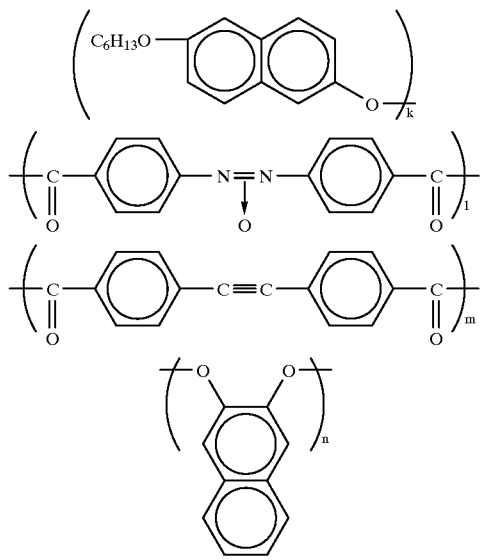

where l+m=k/2+n k/n=80/60~2/99, preferably 40/80~10/95 l/m=100/0~0/100, preferably 95/5~5/95, and k, l, m, and n represent, respectively, a molar ratio.

Structural Formula 32

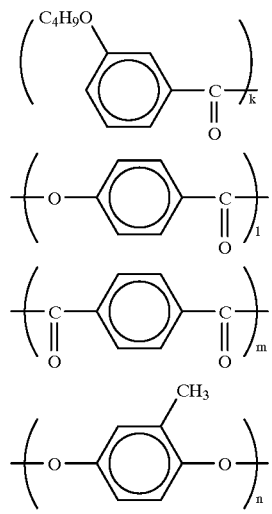

28

-continued

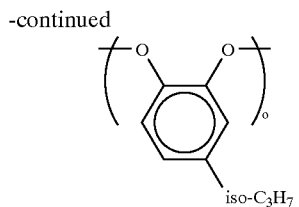

where n+o=k/2+m k/m=80/60~2/99, preferably 40/80~10/95 n/o=100/0~0/100, preferably 95/5~5/95, l/(n+o)=20/10~0/10, preferably 15/10~5/10, and k, l, m, n and o represent, respectively, a molar ratio.

Structural Formula 33

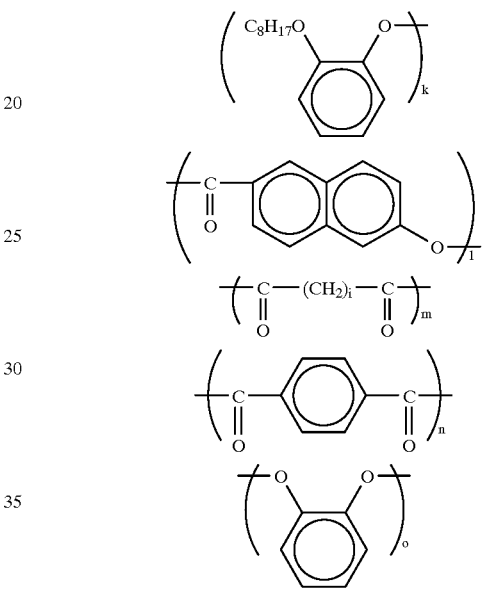

where m+n=k/2+o k/o=80/60~2/99, preferably 40/80~10/95 m/n=100/0~0/100, preferably 95/5~5/95, l/(m+n)=20/10~0/10, preferably 15/10~5/10, and i is an integer of 2 12, and k, l, m, n and o represent, respectively, a molar ratio.

Structural Formula 34

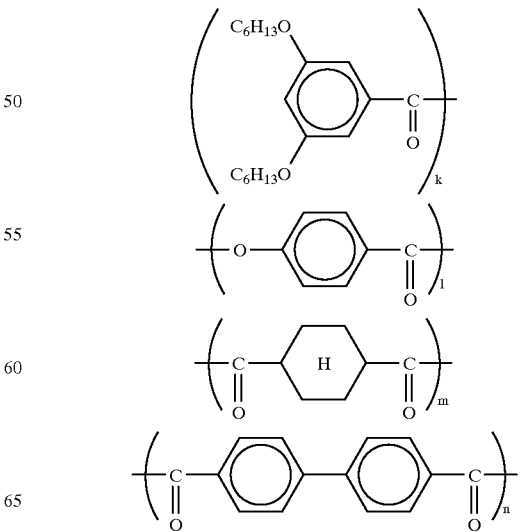

-continued

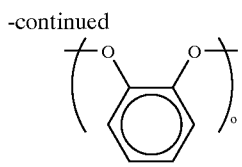

where o=k/2+m+n k/(m+n)=80/60~2/99, preferably 40/80~10/95 m/n=100/0~0/100, preferably 95/5~5/95, l/o= 20/10~0/10, preferably 15/10~5/10, and k, l, m, n and o represent, respectively, a molar ratio.

Structural Formula 35

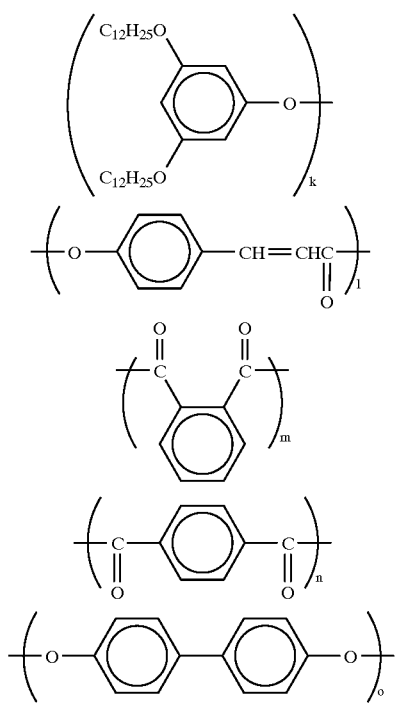

where m+n=k/2+o k/o=80/60~2/99, preferably 40/80~10/95 m/n=100/0~0/100, preferably 95/5~5/95, l/(m+n)=20/10~0/10, preferably 15/10~5/10, and k, l, m, n and o represent, respectively, a molar ratio.

Structural Formula 36

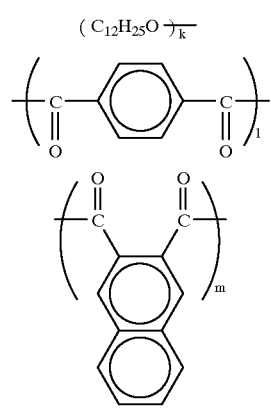

-continued

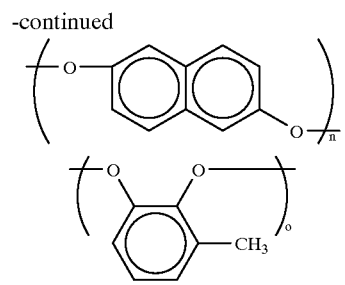

where l+m=k/2+n+o k/(n+o)=80/60~2/99, preferably 40/80~10/95 l/m=100/0~0/100, preferably 95/5~5/95, n/o=100/10~0/100, preferably 95/5~5/95, and k, l, m, n and o represent, respectively, a molar ratio.

Structural Formula 37

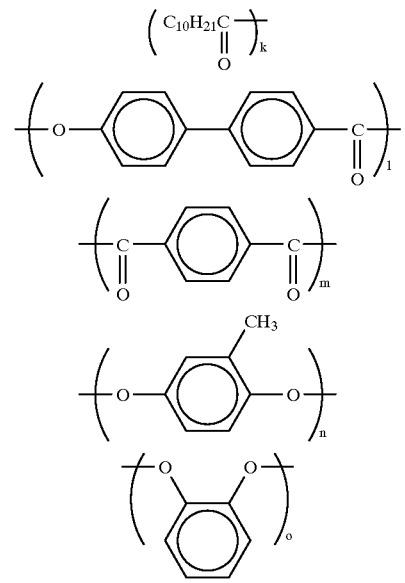

where n+o=k/2+m k/m=80/60~2/99, preferably 40/80~10/95 n/o=100/0~0/100, preferably 95/5~5/95, l/m=20/10~0/10, preferably 15/10~5/10, and k, l, m, n and o represent, respectively, a molar ratio.

Structural Formula 38

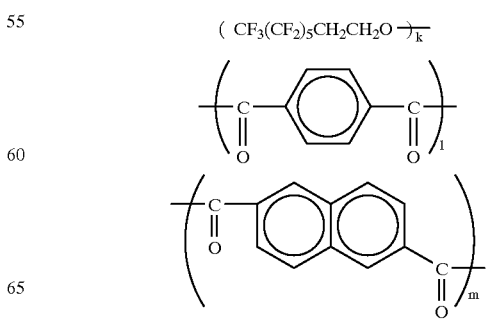

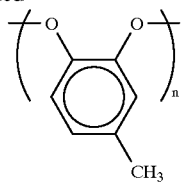

where l+m=k/2+o k/o=80/60~2/99, preferably 40/80~10/95 l/m=100/0~0/100, preferably 95/5~5/95, and k, l, m and n represent, respectively, a molar ratio.

Structural Formula 39

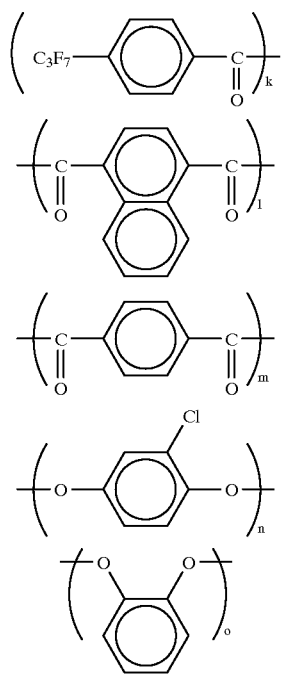

where n+o=k/2+l+m k/(l+m)=80/60~2/99, preferably 40/80~10/95 l/m=100/0~0/100, preferably 95/5~5/95, n/o=100/0~0/100, preferably 95/5~5/95, and k, l, m, n and o represent, respectively, a molar ratio.

Structural Formula 40

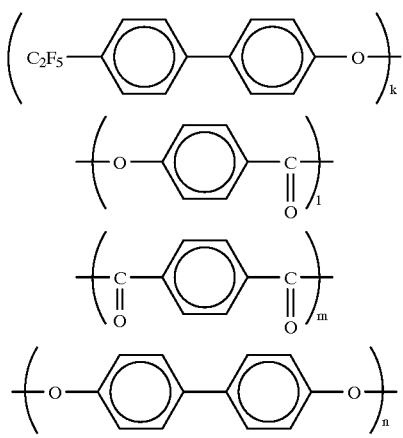

where m=k/2+n+o k/(n+o)=80/60~2/99, preferably 40/80~10/95 n/o=100/10~0/100, preferably 95/5~5/95, l/m= 20/10~010, preferably 15/10~5/10, and k, l, m, n and o represent, respectively, a molar ratio.

Structural Formula 41

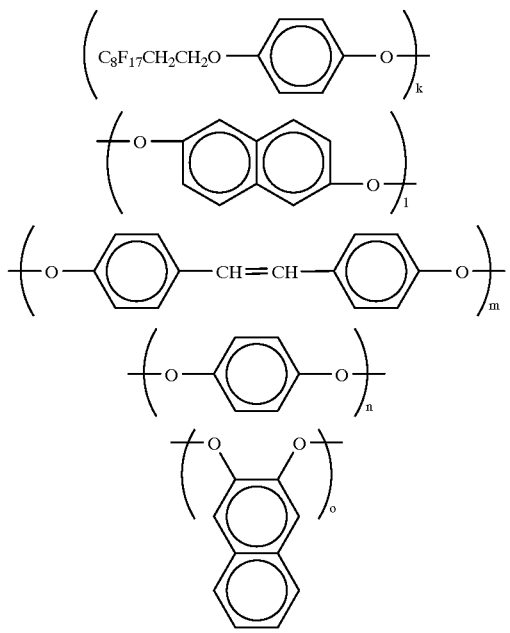

where o=k/2+m+n k/(m+n)=80/60~2/99, preferably 40/80~10/95 m/n=100/0~0/100, preferably 95/5~5/95, l/m= 20/10~0/10, preferably 15/10~5/10, and k, l, m, n and o represent, respectively, a molar ratio.

Structural Formula 42

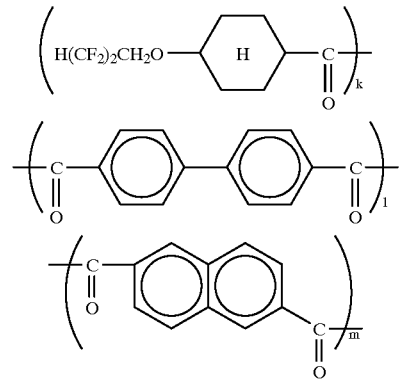

-continued

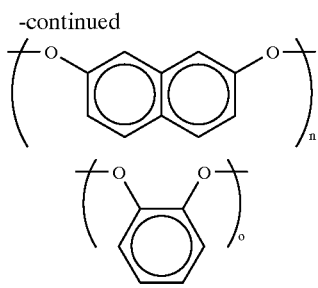

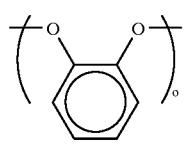

where n+o=k/2+l+m  k/(l+m)=80/60~2/99, preferably 40/80~10/95 l/m=100/0~0/100, preferably 95/5~5/95, n/o=100/0~0/100, preferably 95/5~5/95, and k, l, m, n and o represent, respectively, a molar ratio.

Structural Formula 43

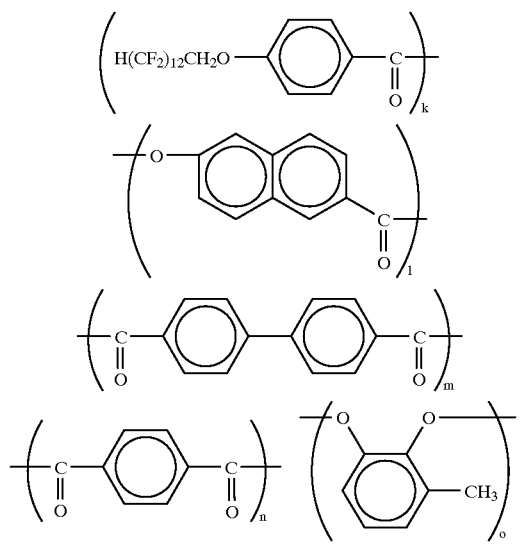

where o=k/2+m+n  k/(m+n)=80/60~2/99, preferably 40/80~10/95 m/n=100/0~0/100, preferably 95/5~5/95, l/o=20/10~0/10, preferably 15/10~5/10, and k, l, m, n and o represent, respectively, a molar ratio.

Structural Formula 44

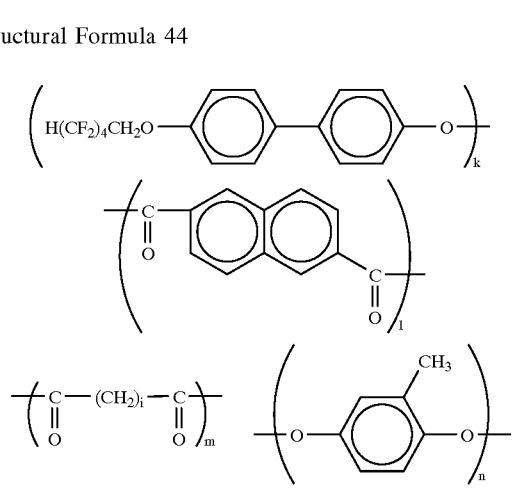

-continued

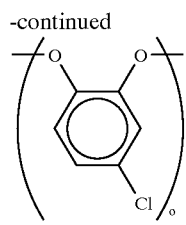

where l+m=k/2+n+o  k/(n+o)=80/60~2/99, preferably 40/80~100/95 l/m=100/0~0/100, preferably 95/5~5/95, n/o=100/0~0/100, preferably 95/5~5/95, and i is an integer of 2 12, and k, l, m, n and o represent, respectively, a molar ratio.

Structural Formula 45

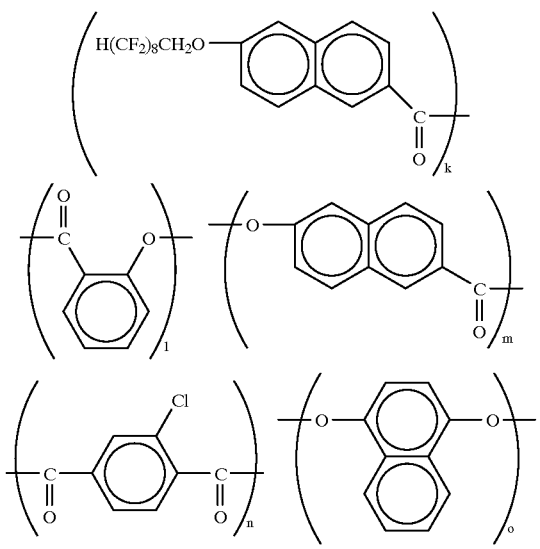

where o=k/2+n  k/n=80/60~2/99, preferably 40/80~10/95 l/m=100/0~0/100, preferably 95/5~5/95, l+m/o=20/10~1/10, preferably 15/10~5/10, and k, l, m, n and o represent, respectively, a molar ratio.

Structural Formula 46

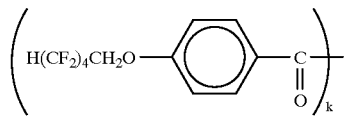
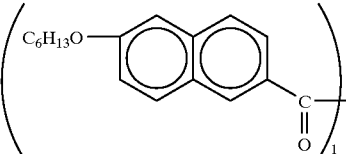
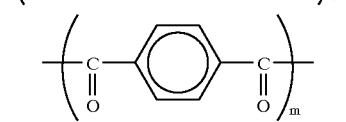
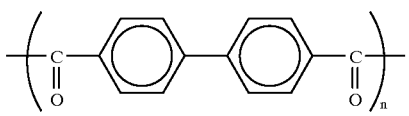

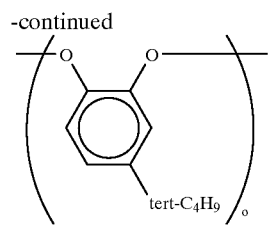

where o=k/2+l/2+m+n (k+l)/(m+n)=80/60~2/99, preferably 40/80~10/95 k/l=100/0~0/100, preferably 90/10~10/90, m/n=100/0~0/100, preferably 95/5~5/95, and k, l, m, n and o represent, respectively, a molar ratio.

Structural Formula 47

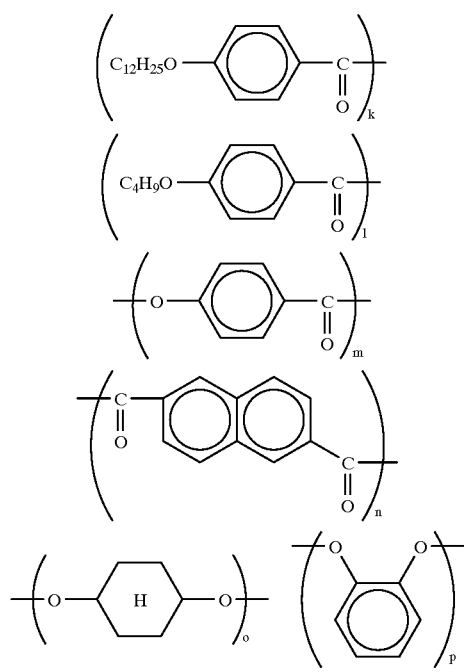

where o+p=k/2+l/2+n (k+l)/n=80/60~2/99, preferably 40/80~10/95 k/l=100/0~0/100, preferably 90/10~10/90, o/p=100/0~0/100, preferably 95/5~5/95, m/n=20/10~0/10, preferably 15/10~5/10, and k, l, m, n, o and p represent, respectively, a molar ratio.

Further, another liquid crystalline polymer which exhibits a homeotropic orientation is a side chain type liquid crystalline polymer which has, as side chain(s), a unit having a substituent group such as an aromatic group having a bulky substituent, aromatic group having a long chain alkyl group, or aromatic group having fluorine atoms. Examples of the side chain type liquid crystalline polymer include polyacrylates, polymethacrylates, polysiloxanes and poly- malonates having the above exemplified side chain(s). Examples of the structure of the side chain type liquid crystalline polymer are given below.

Structural Formula 48

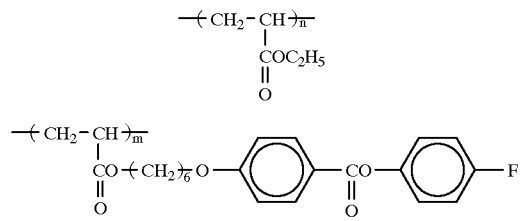

where n/m=80/20~20/80, preferably 75/25~25/75.

Structural Formula 49

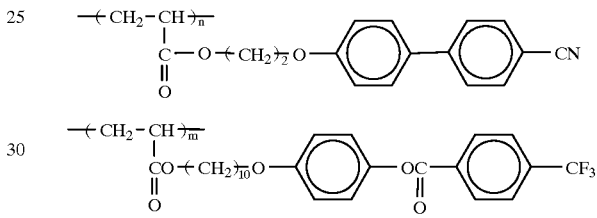

where n/m=80/20~20/80, preferably 75/25~25/75.

Structural Formula 50

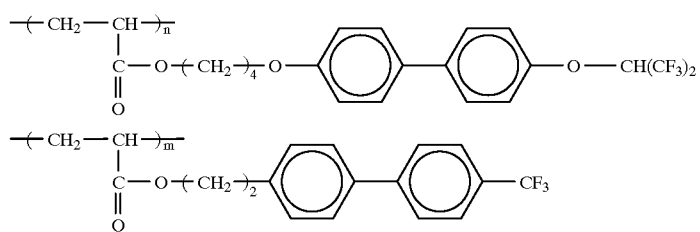

where n/m=80/20~20/80, preferably 75/25~25/75.

Structural Formula 51
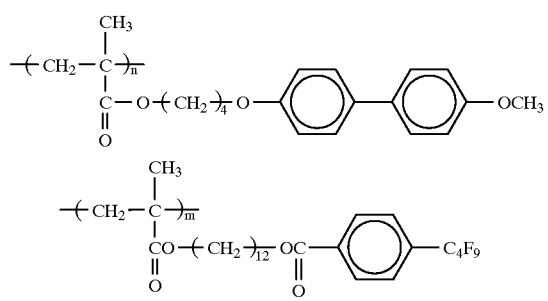
where n/m=80/20~20/80, preferably 75/25~25/75.
Structural Formula 52
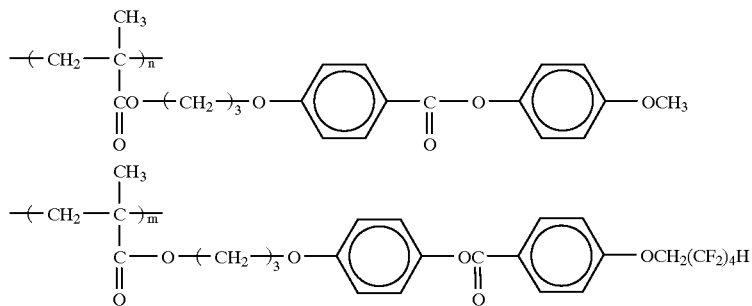
where n/m=80/20~20/80, preferably 75/25~25/75.
Structural Formula 53
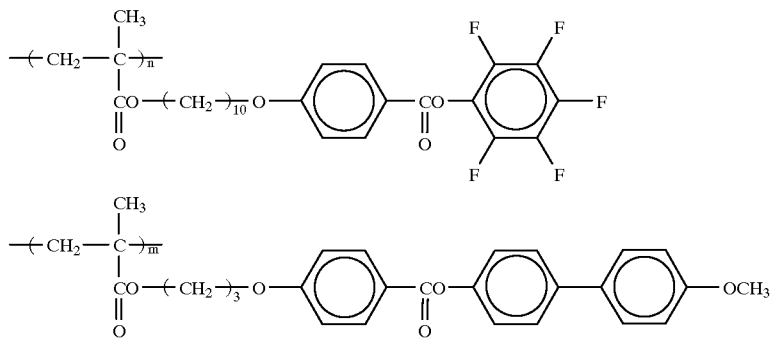
where n/m=80/20~20/80, preferably 75/25~25/75.
Structural Formula 54
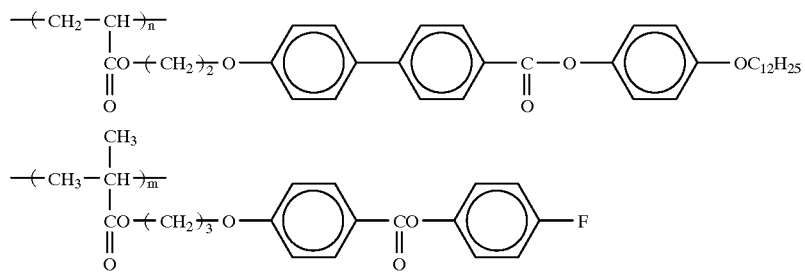
where n/m=80/20~20/80, preferably 75/25~25/75.
Structural Formula 55
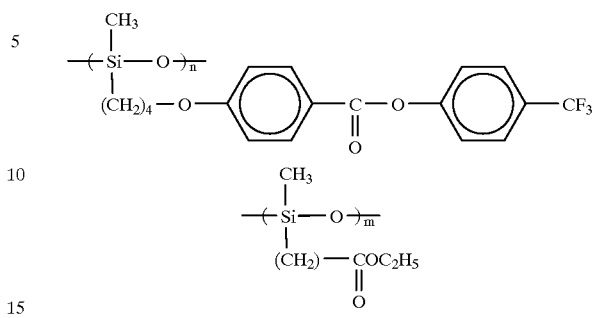
where n/m=80/20~20/80, preferably 75/25~25/75.

Structural Formula 56
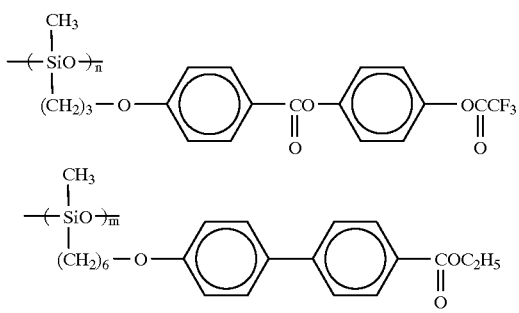
where n/m=80/20~20/80, preferably 75/25~25/75.
Structural Formula 57
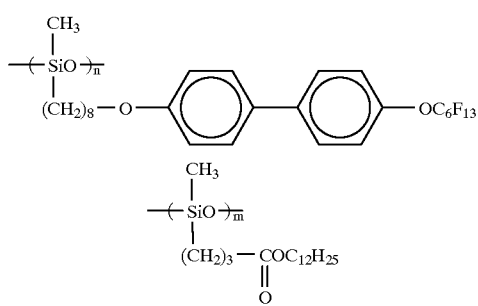
where n/m=80/20~20/80, preferably 75/25~25/75.
Structural Formula 58
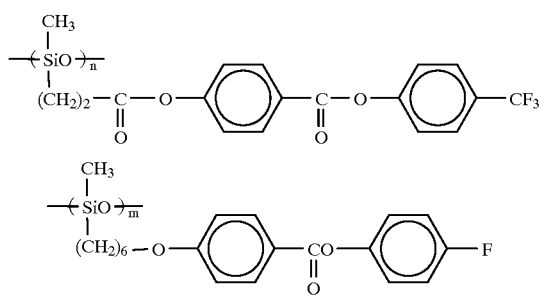
where n/m=80/20~20/80, preferably 75/25~25/75.
Structural Formula 59
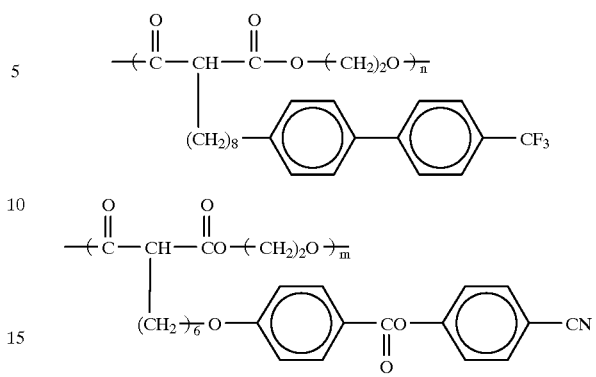
where n/m=80/20~20/80, preferably 75/25~25/75.
Structural Formula 60
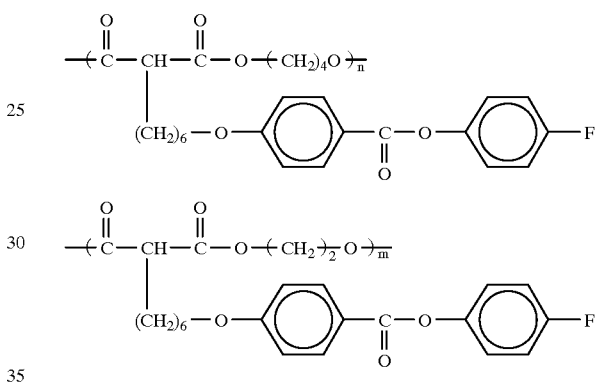
where n/m=80/20~20/80, preferably 75/25~25/75.
Structural Formula 61
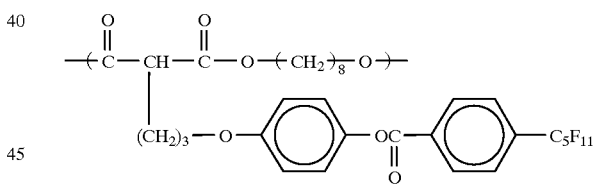
where n/m=80/20~20/80, preferably 75/25~25/75.
Structural Formula 62
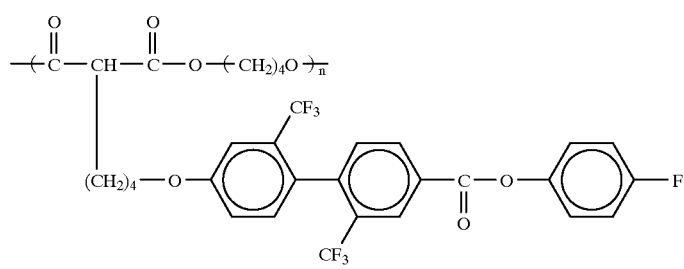

-continued

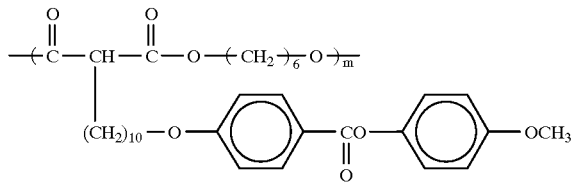

where n/m=80/20~20/80, preferably 75/25~25/75.

In the above mentioned liquid crystal forming polymers of a homeotropic alignment, in the case of a main chain type liquid crystal forming nature polymer 1) having aromatic group with a bulky substituent, an aromatic group with a long chain alkyl group, an aromatic group with a fluorine atom and the like in its structural unit constituting a main chain thereof, a molecular weight is generally in the range of 0.05 to 2.0 or preferably 0.07 to 1.0 in logarithmic viscositymeasured at 30° C. in a variety of solvents such as a mixture solvent of phenol/tetrachloroethane (60/40 by wt ratio). If it is smaller than 0.05, there is a fear that a mechanical strength of a compensating film is weakened. If it is larger than 2.0, there is a fear that a homeotropic alignment nature is lost. In addition, if the logarithmic viscosity is larger than 2.0, there is another fear that a viscosity in a liquid crystalline state is too high and there thereby arises a possibility that a time required for alignment is longer even if the polymer is aligned in a homeotropic orientational order. Moreover, there is a further fear that no nematic hybrid orientational order is achieved in fabrication of a compensating film described later.

In the case of a liquid crystal forming polymer 2) having a monofunctional structural unit which is derived from a compound having: a long alkyl group of the carbon number of 3 to 20, a long chain fluoroalkyl group of the carbon number of 2 to 20 or the like; and one of functional portions such as mono-alcohol, a mono-carboxylic acid and the like at one end or both ends of its polymer chain, a molecular weight is generally in the range of 0.04 to 1.5 or preferably 0.06 to 1.0 in logarithmic viscosity measured at 30° C. in a variety of solvents such as a mixture solvent of phenol/ tetrachloroethane (60/40 wt ratio). If it is smaller than 0.04, there is a fear that a mechanical strength of a compensating film is weakened. If it is larger than 1.5, there is a fear that a homeotropic alignment nature is lost. In addition, if the logarithmic viscosity is larger than 1.5, there is another fear that a viscosity in a liquid crystalline state is too high and there thereby arises a possibility that a time required for alignment is longer even if the polymer is aligned in a homeotropic orientational order. Moreover, there is a further fear that no nematic hybrid orientational order is achieved in fabrication of a compensating film described later.

In the case of a side chain type liquid crystal forming polymer, a molecular weight is generally in the range of 1,000 to 100,000 or preferably 3,000 to 50,000 in weight average molecular weight as polystyrene. If it is smaller than 1000, there is a fear that a mechanical strength of a compensating film is undesirably weakened. If it is larger than 100,000, there is a fear that a solubility of the liquid crystal forming polymer in a solvent is decreased and for example, a solvent viscosity for a coating solution is thereby too high, which causes an undesirable problem that a uniform coat cannot be obtained in fabrication of a compensating film described later.

A synthetic method for the liquid crystal forming polymer is not restrictive. The polymer can be synthesized in a polymerization method well known in the art. For example, taking up a synthesis of a liquid crystal forming polyester as an example, this polymer can be synthesized by means of a molten polymerization method or a corresponding acid chloride method using an acid chloride of di-carboxylic acid.

In synthesis of a liquid crystal forming polymer of the present invention, a monofunctional structural unit is provided to polymerization reaction as a mono-alcohol, a moncarboxylic acid compound, as described above, and a functional derivative therefrom, in a concrete manner an acetyl compound, a halide or the like. A content of the monofunctional structural unit in a liquid crystal forming polymer, in a concrete manner a liquid crystal forming polyester, is in the range of 2/201 to 80/240 or preferably 10/205 to 20/220 in molar fraction on the basis of the total moles of the constituents other than a hydroxycarboxylic acid structural unit. If it is smaller than 2/210 (mole fraction), there is a fear that a liquid crystal forming polyester does not show a homeotropic alignment nature. If it is larger than 80/240, there is a fear that a molecular weight of a liquid crystal forming polyester is not increased to a desired value. Besides, when a compensating film is fabricated from the liquid crystal forming polymer, a mechanical strength of the film is weakened, which is not preferable. A content of a monofunctional structural unit corresponds to a charging amount of a monomer constituent in a reaction mixture.

As a liquid crystal forming polymer optically showing a positive uniaxiality, there may also be used a composition properly mixed with a liquid crystal forming polymer showing another orientational nature and a non-liquid crystalline nature polymer not showing any liquid crystalline nature in addition to a liquid crystal forming polymer of a homeotropic alignment as a constituent.

With use of the composition, enjoyed are the following advantages:

1) an average tilt angle of a nematic hybrid orientational order is freely controlled by adjustment on compositional ratios; and 2) stabilization of a nematic hybrid orientational order can be realized.

However, unless a liquid crystal forming polymer is a composition constituted of a mixture optically showing a positive uniaxiality and has a nematic hybrid orientational order produced in a liquid crystalline phase of the liquid crystal forming polymer, a compensating film used in the present invention cannot be obtained. When liquid crystal forming polymer is used in the form of a composition, a liquid crystalline nature polymer of a homeotropic alignment is desirably included at a compositional ratio of 5 wt % or more in the composition. If it is smaller than 5 wt %, there is a fear that no nematic hybrid orientational order is obtained.

As a liquid crystal forming polymer which can be mixed in a composition, a liquid crystal forming polymer which shows an orientational nature other than a homeotropic nature is usually employed in a proper manner from a view point of compatibility with a liquid crystal forming polymer of a homeotropic alignment. As kinds of liquid crystal forming polymer used, there can be named a main chain type liquid crystal forming polymer, for example polyester, polyimide, polyamide, polycarbonate, polyesterimide and the like, and a side chain type liquid crystal forming polymer, for example polyacylate, polymethacrylate, polysiloxane, polymalonate and the like. Though there is no specific limitation as far as a liquid crystal forming polymer used is compatible with a liquid crystal forming polymer of a homeotropic alignment, preferably used is especially a liquid crystal forming polymer of a homogeneous alignment, in a more concrete manner, polyester, polyacrylate, polymethacrylate or the like, all of a homogeneous alignment. A liquid crystal forming polyester having an ortho-subsituted aromatic unit as a main chain already shown (a chemical formula 4) is the most preferable one of all the above mentioned.

Concrete structural examples of liquid crystal forming polymers each of a homogeneous alignment are shown below.

Structural Formula 63

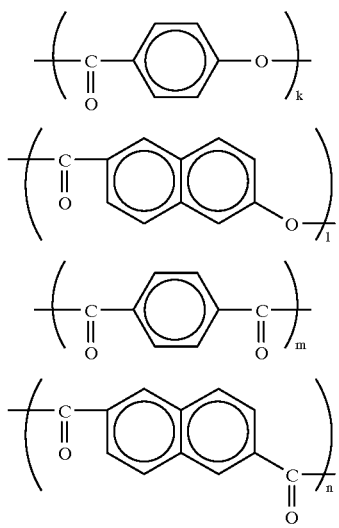

where k=l+m l/m=80/20~20/80, preferably 75/25~25/75, and k, l, and m represent, respectively, a molar ratio.

Structural Formula 64

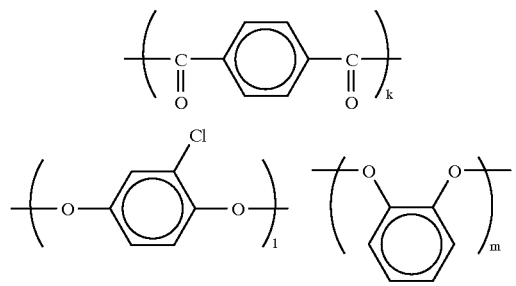

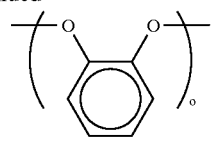

where o=m+n, (k+l)/o=20/10~0/10, preferably 15/10~0/10, m/n=100/0~0/100, preferably 98/2~2/98, and k, l, m, n and o represent, respectively, a molar ratio.

Structural Formula 65

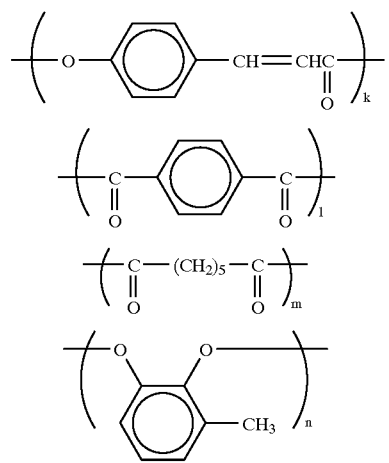

where n=l+m, k/m=20/10~0/10, preferably 15/10~0/10, and k, l, mn and n represent, respectively, a molar ratio.

Structural Formula 66

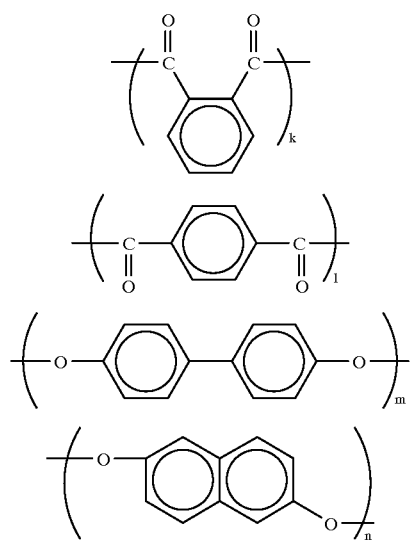

where k+l=m+n, k/l=100/0~0/100, preferably 95/5~5/95, m/l=100/0~0/100, preferably 95/5~5/95, and k, l, m and n represent, respectively, a molar ratio.

Structural Formula 67

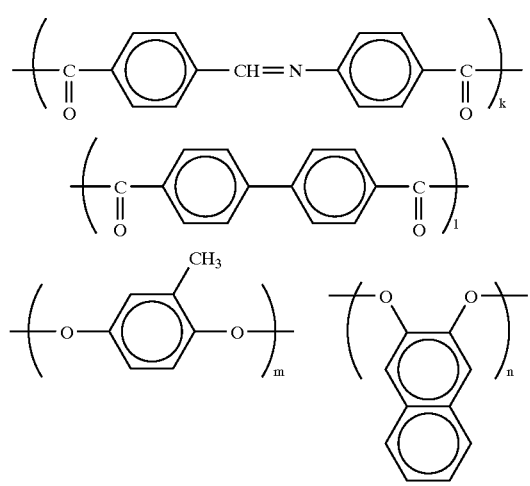

where k+l=m+n, k/l=100/0~0/100, preferably 95/5~5/95, m/n=100/0~0/100, preferably 95/5~5/95, and k, l, m and n represent, respectively, a molar ratio.

Structural Formula 68

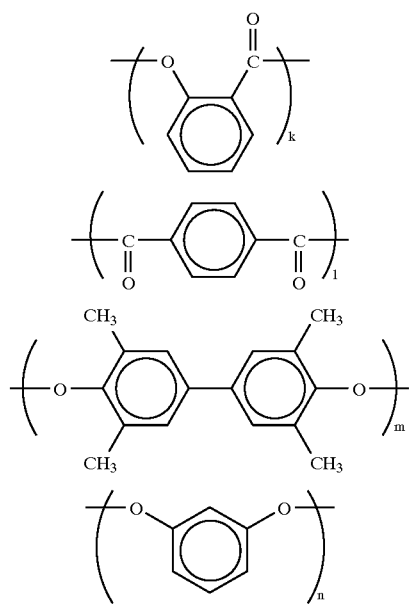

where l=m+n, k/l=15/10~0/10, preferably 10/10~0/10, m/n=100/0~0/100, preferably 95/5~5/95, and k, l, m and n represent, respectively, a molar ratio.

Structural Formula 69

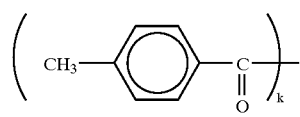

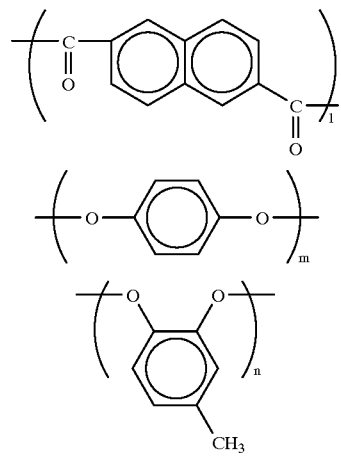

where m+n=k/2+l k/l=40/80~0/100, preferably 20/90~0/100 m/l=100/0~0/100, preferably 95/5~5/95, and k, l, m and n represent, respectively, a molar ratio.

Structural Formula 70

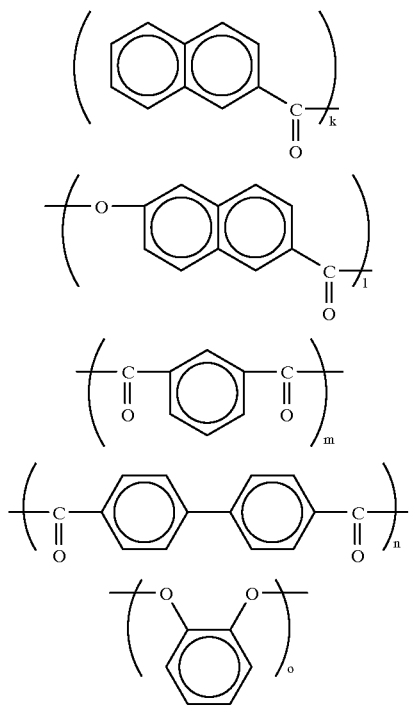

where o=k/2+m+n k/(m+n)=40/80~0/100, preferably 20/90~0/100 m/n=100/0~0/100, preferably 95/5~5/95, l/o= 20/10~0/10, preferably 15/10~5/10, and k, l, m, n and o represent, respectively, a molar ratio.

Structural Formula 71

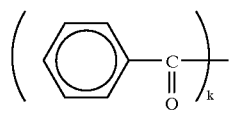

-continued

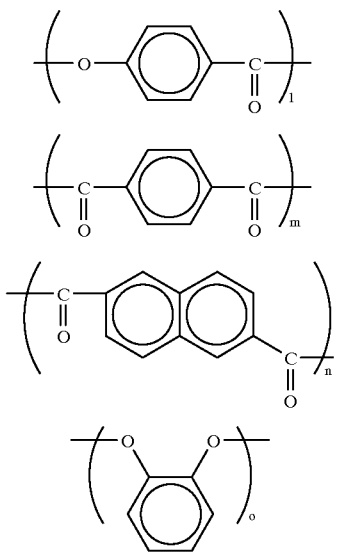

where o=k/2+m+n k/(m+n)=40/80~0/100, preferably 20/90~0/100 m/n=100/0~0/100, preferably 95/5~5/95, l/o= 20/10~0/10, preferably 15/10~5/10, and k, l, m, n and o represent, respectively, a molar ratio.

Structural Formula 72

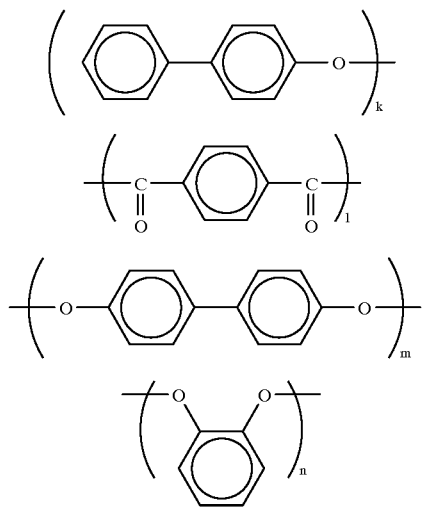

where l=k/2+m+n k/(m+n)=40/80~0/100, preferably 20/90~0/100 n/m=100/0~0/100, preferably 95/5~5/95, and k, l, m and n represent, respectively, a molar ratio.

Structural Formula 73

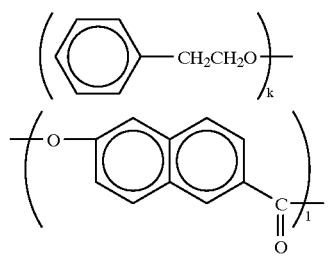

-continued

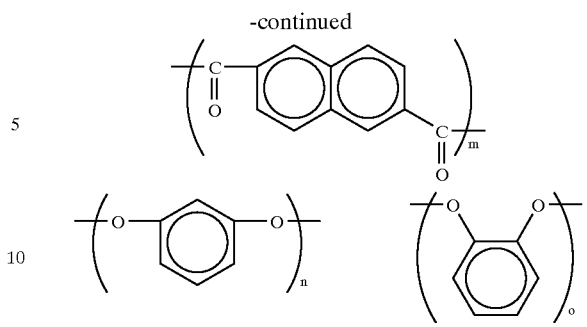

where m=k/2+n+o k/(n+o)=40/80~0/100, preferably 20/90~0/100 n/o=100/0~0/100, preferably 95/5~5/95, l/m= 20/10~0/10, preferably 15/10~5/10, and k, l, m, n and o represent, respectively, a molar ratio.

Structural Formula 74

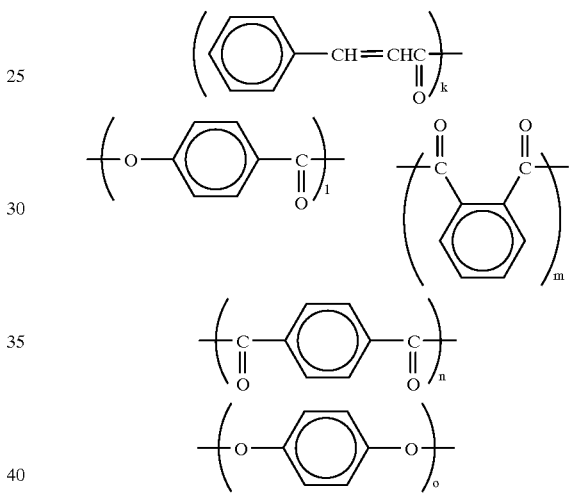

where o=k/2+m+n k/(m+n)=40/80~0/100, preferably 20/90~0/100 m/n=100/0~0/100, preferably 95/5~5/95, l/o= 20/10~0/10, preferably 15/10~5/10, and k, l, m, n and o represent, respectively, a molar ratio.

Structural Formula 75

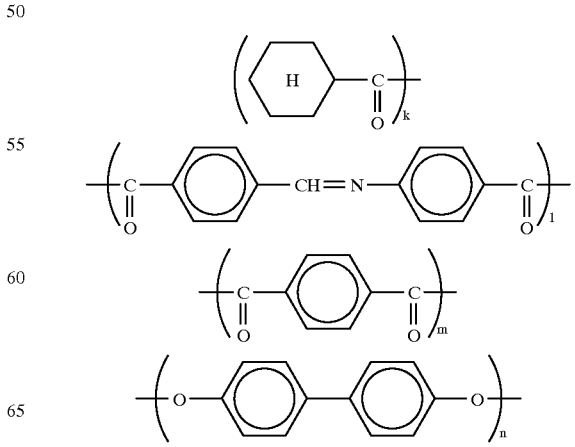

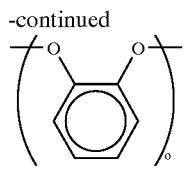

where n+o=k/2+l+m, k/(l+m)=40/80~0/100, preferably 20/90~0/100 l/m=100/0~0/100, preferably 95/5~5/95, n/o= 100/0~0/100, preferably 95/5~5/95, and k, l, m, n and o represent, respectively, a molar ratio.

A molecular weight of a main chain type liquid crystal forming polymer generally is preferably in the range of 0.05 to 3.0 or more preferably 0.07 to 2.0 in logarithmic viscosity measured at 30° C. in various solvent, for example a solvent mixture of phenol/tetracloroethane (60/40 wt ratio) . If a logarithmic viscosity is smaller than 0.05, there is a fear that a mechanical strength of a compensating film is weakened. If it is a larger than 3.0, there is a fear that formation of a homeotropic alignment is interfered, or there is another fear that a viscosity in formation of a liquid crystal is too high and thereby a time required for alignment is too long, which is not preferable.

A molecular weight of a side chain type liquid crystal forming polymer is generally in the range of 5,000 to 200,000 or preferably 10,000 to 150,000 in weight average molecular weight as polystylene. If it is smaller than 5,000, there is a fear that a mechanical strength of a compensating film is weakened. If it is larger than 200,000, a solubility of a polymer in a solvent is reduced and a solvent viscosity of a coating solution is too high and thereby there is a fear that a problem in film formation arises that no uniform coat cannot be obtained, which is not desirable.

Judgment on a homogeneous orientational nature is conducted by use of a substrate whose surface is not subjected to surface treatments such as a silicone treatment, a rubbing treatment, uniaxial drawing and the like. The liquid crystal forming polymer layer is formed on the substrate and judgment is conducted on whether or not the film shows a homogeneous alignment nature based on its alignment state.

The synthetic method of the liquid crystal forming polymer is not especially restrictive. The liquid crystal forming polymer can be synthesized by a method well known in the art. For example, taking up a synthesis of a liquid crystal forming polyester as an example, this polymer can be synthesized by means of a molten polymerization method or a corresponding acid chloride method using an acid chloride of di-carboxylic acid.

In order to obtain a compensating film in which a nematic hybrid orientational order is fixed in a uniform manner with use of a liquid crystal forming polymer having a positive uniaxiality, as mentioned above, it is preferred in the present invention that the following process steps are employed, which will be described.

First of all, description on a alignment substrate will be given.

In order to achieve a nematic hybrid orientational order with use of a liquid crystal forming polymer having a positive uniaxiality as in the present invention, it is desirable that the liquid crystal forming polymer is sandwiched by interfaces of different kinds on respective upper and lower surfaces of the polymer. When the polymer is sandwiched by interfaces of the same kind on the upper and lower surfaces, an orientational order at each of the upper and lower interfaces of the liquid crystalline polymer is of the same kind and a nematic hybrid orientational order is thereby hard to be attained.

As a concrete aspect, one alignment substrate and an air interface are utilized. In a concrete manner, a lower boundary surface of the liquid crystal forming polymer contacts a surface of the substrate and the upper boundary surface of the polymer is exposed to the air. Though substrates having different surfaces are respectively used for the upper and lower interfaces, it is desirable to use one alignment substrate and an air interface from a view point of a fabrication process.

An alignment substrate which can be used in the present invention desirably has anisotropy so that a direction of inclination of a liquid crystal (projection on an alignment substrate of a director) can be controlled. If an inclination direction of a director of the liquid crystal cannot be controlled, there can only be obtained orientational disorder where projected vectors of directors on the substrate are not aligned in an orderly manner.

As the alignment substrate, it is desired, in a concrete manner, that the substrate has anisotropy in a surface thereof and there are named: plastic film substrates made of polyimide, polyamideimide, polyamide, polyetherimide, polyetheretherketone, polyetherketone, polyketonesulfide, polyethersulfone, polysulfone, polyphenylenesulfide, polyphenyleneoxide, polyethyleneterephthlate, polybutyleneterephthlate, polyethylenenaphthalate, polyacetal, polycarbonate, polyarylate, acrylic resin, polyvinylalcohol, polypropylene, cellulose-base plastics, epoxy resin, phenol resin and the like, uniaxially drawn plastic film substrates, metal substrates with recesses like slits on the surface made of aluminum, iron, copper and the like, or glass substrates with slits formed by etching on the surface made of alkali glass, boro-silicated glass, flint glass and the like.

There can be used in the present invention: a rubbing plastic film substrate whose substrates is subjected to a rubbing treatment; one of the various substrates mentioned above having a plastic thin film, for example a rubbing polyimide film, a rubbing polyvinylalcohol film or the like, treated by a rubbing treatment; and one of the various substrates mentioned above having an oblique vapor deposition film of silicon dioxide.

Among the alignment substrate described above, preferred substrates to achieve nematic hybrid orientational order can be various substrates each having a rubbing polyimide film, a rubbing polyimide substrate, a rubbing polyetheretherketone substrate, a rubbing polyetherketone substrate, a rubbing polyethersulfone substrate, a rubbing polyphenylenesulfide substrate, a rubbing polyethyleneterephthlate substrate, a rubbing polyethylenenaphthalate substrate, a rubbing polyarylate substrate and a rubbing cellulose-base plastic substrate. A rubbing direction of each of these substrates generally corresponds to a tilt direction of a compensating film described above.

The compensating films used for a liquid crystal display device of the present invention have different angles to respective upper and lower film surfaces of directors of a liquid crystalline polymer as described above. An angle to a film surface of a director in the vicinity of the film surface, which contacts with an alignment substrate, is adjusted so as to fall in the ranges of either 0 to 50 degrees or 60 to 90 degrees depending on a method of an alignment treatment or a kind of a liquid crystal forming polymer. Generally, an angle to a film surface of a director of the liquid crystalline polymer in the vicinity of the film surface, which constitutes an interface, is preferably adjusted so as to fall in the range of 0 to 50 degrees form a viewpoint of a fabrication process.

The compensating film can be obtained by following the steps of, applying a liquid crystal forming polymer optically showing a positive uniaxiality on one of the alignment substrates to form a coat as described above in a uniform manner; and subsequently, the coat is subjected to a uniform alignment step, followed by a fixation step, in which an alignment state is fixed. The coating of the liquid crystal forming polymer can generally be performed in the following ways in which the polymer is dissolved in a solvent, for which various solvents are available, to prepare a solution and then the solution is applied or the polymer is molten and then applied in the molted state. The coating by use of the solution is desirable form a standpoint of a fabrication process.

In application of a coating solution, a liquid crystal forming polymer is dissolved in a proper solvent to prepare a solvent with a predetermined concentration.

As solvents, while the solvents cannot definitely be described since a solvent is determined according to a kind (a compositional ratio or the like) of liquid crystal forming polymer having a positive uniaxiality, there can generally be named, halogenated hydrocarbons such as chloroform, dichloromethane, carbon tetrachloride, dichloroethane, tetrachloroethane, trichloroethylene, tetrachloroethylene, chlorobenzene, orthodichlorobenzene; phenols such as phenol, para-chlorophenol; aromatic hydrocarbons such as benzene, toluene, xylene, methoxybenzen, 1,2-dimethoxybenzene; acetone, ethylacetate, tert-butylalcohol, glycerin, ethyleneglycol, triethyleneglycol, ethyleneglycolmonomethylether, diethyleneglycoldimethylether, ethylcellosolve, butylcellosolve, 2-pyrolidone, N-methyl-2-pyrolidone, pyridine, triethylamine, tetrahydrofuran, dimethylformamide, dimethylacetoamide, dimethylsulfoxide, acetonitrile, butyronitrile, carbon disulfide; and a mixture solvent thereof, for example a solvent mixture of a halogenated hydrocarbon and a phenol.

A concentration in a solution cannot clearly be prescribed since it is dependent on a solubility of a liquid crystal forming polymer having a positive uniaxiality in use and a thickness of a compensating film which is a target product, but a concentration is generally selected in the range of 3 to 50 wt % or preferably 7 to 30 wt %.

A solution of a liquid crystal forming polymer having a positive uniaxiality whose concentration is adjusted to a predetermined value with use of a solvent, which is described above, is applied on an alignment substrate which is described above. As a method of applying a solvent, there can be named, a spin coat method, a roll coat method, a printing method, an immersion/pulling method, a curtain coat method.

After coating, a solvent is removed and a liquid crystal forming polymer layer with a uniform thickness is first formed on the substrate. A condition of solvent removal is not specially limited, but there can be employed any conditions where almost all the solvent can be removed and the liquid crystal forming polymer layer is not fluidized nor flows down from the substrate. Generally, a solvent is removed by use of drying at room temperature, drying in a drying furnace, blowing of warm or hot air or the like.

In stages of coating and drying process steps, an object is to form a uniform liquid crystal forming polymer layer on a substrate and the polymer has not still established a nematic hybrid orientational order therein. In a next heat treatment step, a nematic hybrid orientational order is completed in the layer as a single domain.

In a formation process of a nematic hybrid orientational order by a heat treatment, a viscosity of a liquid crystal forming polymer is preferably lower in a sense that a alignment caused by an interface effect is encouraged. Therefore, a temperature of a heat treatment is desirably higher. There is a case where a average tilt angle of a particular liquid crystalline polymer is different at a different temperature of a heat treatment. In such a case, a temperature of a heat treatment is required to be selected in order to attain an average tilt angle which is suitable for the purpose. For example, in the case where a heat treatment is required to be conducted at a comparatively low temperature in order to attain an orientational order having a tilt angle, a viscosity of a liquid crystal forming polymer is high at a low temperature and a time requirement for alignment is long. In such a case, it is effective that the polymer is temporarily heated at a high temperature to attain a single-domain orientational order and thereafter a temperature of the same heat treatment is gradually or stepwise reduced to a target temperature. In any case, it is desirable that a liquid crystal forming polymer having an optically positive uniaxiality is heated at temperature equal to, or higher than a glass transition point according to characteristics of the polymer. A temperature of a heat treatment is generally preferred to be set in the range of 50 to 300° C. or especially preferred to be set in the range of 100 to 260° C.

While a time of the heat treatment required for sufficient alignment of a liquid crystal forming polymer cannot clearly be prescribed since it is different in different conditions of a kind of the polymer (for example, a compositional ratio) and a temperature of the heat treatment, the time requirement is generally preferred to be set in the range of 10 sec to 120 min or especially preferred to be set in the range of 30 sec to 60 min. If it is shorter than 10 sec, there is a fear that poor alignment arises. If it is longer than 120 min, there is another feat that productivity is undesirably decreased.

In such a manner, a liquid crystalline state of a uniform nematic hybrid orientational order can be established across all the surface of the alignment substrate as a first stage.

In the heat treatment process, a magnetic field or an electric field is applied in order to obtain a nematic orientational order in a liquid crystal forming polymer without any adverse effect. However, when a magnetic field or an electric field is applied while being subjected to a heat treatment, the liquid crystal forming polymer is easy to be aligned so as to establish a director with a definite direction because a uniform force in the field acts on the polymer under application of the magnetic field or the electric field. That is, a nematic hybrid orientation order in which a director of the polymer forms a different angle along a thickness direction of the film as in the present invention is hard to be obtained. If a force of the field is removed after an orientational order other than a nematic hybrid orientational order, for example a homeotropic, homogeneous orientational order or the like is established, a nematic hybrid orientational order which is thermally stable can be obtained, which does not particularly have any merit from a standpoint of a process.

The nematic hybrid orientational order formed in a liquid crystalline state of the liquid crystal forming polymer with a positive uniaxiality is then cooled to a temperature equal to or lower than a liquid crystal transition temperature to the polymer and thereby a structure can be fixed without any loss in uniformity of the orientational order.

The cooling temperature is not specifically restrictive as far as a temperature is equal to or lower than a liquid crystal transition temperature. For example, if the polymer is cooled at a temperature lower than the liquid crystal transition temperature of the polymer by 10° C., a uniform nematic hybrid orientational order can be fixed. Means for cooling is not specifically restrictive and only if the polymer is taken out from a heating atmosphere in the heat treatment to an atmosphere having a temperature equal to or lower than the liquid crystal transition temperature, for example room temperature, a structure of the polymer is fixed. In order to increase in an efficiency of productivity, forced or gradual cooling with air or water may be adopted. However, some liquid crystal forming polymer with a positive uniaxiality attains a different average tilt angle at a different cooling speed. When there arises a need that such a liquid crystal forming polymer is used and an average tilt angle has to be precisely controlled, a cooling operation is preferably conducted in proper consideration of a cooling condition.

Control of an angle along a thickness direction of a film in the nematic hybrid orientational order will be described. An angle of a director of a liquid crystal forming polymer to a film surface can be controlled to a desired angle by properly selecting a kind (such as a compositional ratio) of a liquid crystal forming polymer in use, an alignment substrate, conditions of a heat treatment and the like. Besides, even after the nematic hybrid orientational order is fixed, a desired angle can be obtained by use of methods in which for example, a surface of the film is shaved in a uniform manner or a surface of the film is in a uniform manner dissolved by immersing the film in a solvent. A solvent used in this case, has to be properly selected based on a kind of liquid crystal forming polymer and a kind of alignment substrate.

A compensating film to be obtained in the process mentioned above has a uniform and fixed orientational order called a nematic hybrid orientational order and because of establishment of the orientational order, an upper side of the film is not equivalent to the lower side and anisotropy arises along directions in a plane parallel to a surface as well. As conditions of use of a compensating film or films in the cases where the compensating film or films are used by being inserted between a liquid crystal cell and an upper polarizing plate or the lower polarizing plate, or both between a liquid crystal cell and an upper polarizing plate, and the liquid crystal cell and the lower polarizing plate, the following three cases can be conceived, 1) an alignment substrate is separated from the compensating film in a spaced manner and the compensating film is independently used;
2) a compensating film is used as is fabricated on an alignment substrate; and
3) a compensating film is used by laminated on a different substrate other than an alignment substrate.

In the cases of uses of 2) and 3), while an alignment substrate is required in order to obtain a nematic hybrid orientational order, if an alignment substrate which can adversely affect in use for a TN-LCD is used, the alignment substrate can be eliminated after alignment and fixation of the nematic hybrid orientational order. A compensating film used in the present invention, which has experienced alignment and fixation, receives no disturbance in orientational order even by eliminating the alignment substrate. In a liquid crystal display device of the present invention, any of the above three cases can be used.

A protective layer such as a transparent plastic film can also be provided for a compensating film for the purpose to protect a surface, increase a strength and improve environmental reliability. As a protective layer, a substrate which has a preferable optical properties, for example a plastic substrate made of polymethacrylate, polycarbonate, polyvinyl alcohol, polyethersulfone, polysulfone, polyarylate polyimide, amorphous polyolefin, triacetylcellulose or the like can be used as being bonded with an optical grade adhesive or pressure-sensitive adhesive interposing therebetween.

A compensating film described above is disposed between a liquid crystal cell for driving and a upper or lower polarizing plate and thereby, there can be obtained a broadening effect of a viewing angle, which has never conventionally been achieved as a twisted nematic type liquid crystal display using a TFT element or an MIM element.

EMBODIMENTS

Embodiments will be described and the present invention is not limited to them. Analytical methods used in the examples are as follows, 1) Determination of a composition of a liquid crystal forming polymer A polymer was dissolved in deuterium containing chloroform or deuterium containing trifluoroacetic acid and the composition was determined by measuring $^1$H-NMR spectrum at 400 MHz (JNM-GX400 made by Nihon Denshi Co.).

2) Measurement on a logarithmic viscosity

A Ubbelohde viscometer was used to measure a logarithmic viscosity in a solvent mixture of phenol/tetrachloroethane of 60/40 wt. ratio at 30° C.

3) Determination of a liquid crystalline phase

A phase was determined by a DSC (Perkin Elmer DCS-7) measurement and observation with an optical microscope (a polarization microscope BH2 made by Olympus Optical Co., Ltd)

4) Measurement on refractive index

An Abbe refractometer Type-4 made by Atago K.K. was used.

5) Polarization analysis

A elipsometer DVA-36VWLD made by K.K. Mizonojiri Kogaku Kogyo was used.

6) Thickness measurement

A high precision thin film step measuring instrument ET-10 made by K.K. Kosaka Kenkyujo was used. In addition, used was a method of determining a thickness from measured data of optical interference (an ultraviolet/visible/near-infrared spectrophotometer V-570 made by Nihon Bunko K.K.) and measured data of a refractive index.

Comparative Embodiment

Synthesis of Liquid Crystal Forming Polyester

One hundred mmol of 6-hydroxy-2-naphtoic acid, 100 mmol of terephthalic acid, 50 mmol of chlorohydroquinone, 50 mmol of tert-butyl catechol and 600 mmol of acetic anhydride were used to perform an acetylation reaction in a nitrogen atmosphere at 140° C. for 2 hours. Subsequently, polymerization was conducted at 270° C. for 2 hours, at 280° C. for 2 hours and at 300° C. for 2 hours. An obtained reaction product was dissolved in teterachloroethane, purified by reprecipitation with methanol to produce 40.0 g of a liquid crystal forming polyester (Formula (1)). A logarithmic viscosity of the liquid crystal forming polyester was 0.35 and had a nematic phase as a liquid crystalline phase, and a isotropic-liquid crystalline phase transition temperature was 300° C. or higher and a glass transition temperature was 135° C.

Alignment Test of a Liquid Crystal Forming Polyester

This liquid crystal forming polyester was used to prepare a 10 wt % solution in a solvent mixture of phenol/tetrachloroethane of 6/4 in wt ratio. This solution is applied on a soda glass plate by a screen printing method to form a film, and the film is dried, subjected to a heat treatment at 230° C. for 30 min and thereafter cooled for fixation at room temperature. A film 1 of 20 μm thick, oriented in a uniform manner was obtained. When the film 1 was observed with a conoscope, it was found that the film showed an optically positive uniaxiality. It was also found that this polyester had a homeotropic alignment nature.

Confirmative Operation on Orientational Structure 1)
Formula (1)

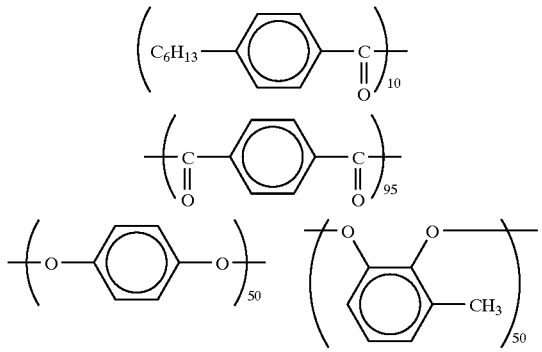

A tetraethane solution of a liquid crystal forming polyester expressed by Formula (1) of 8 wt % was prepared, the solution was applied on a glass having a rubbing polyimide film thereon by a spin coat method to form a solution film, the solution film was dried and received a heat treatment at 250° C. for 30 min, followed by cooling for fixation, so that a compensating film was obtained. Thus obtained film 2 on a substrate was transparent without no alignment defects and uniform with a thickness of 2.0 μm.

Figure 3:
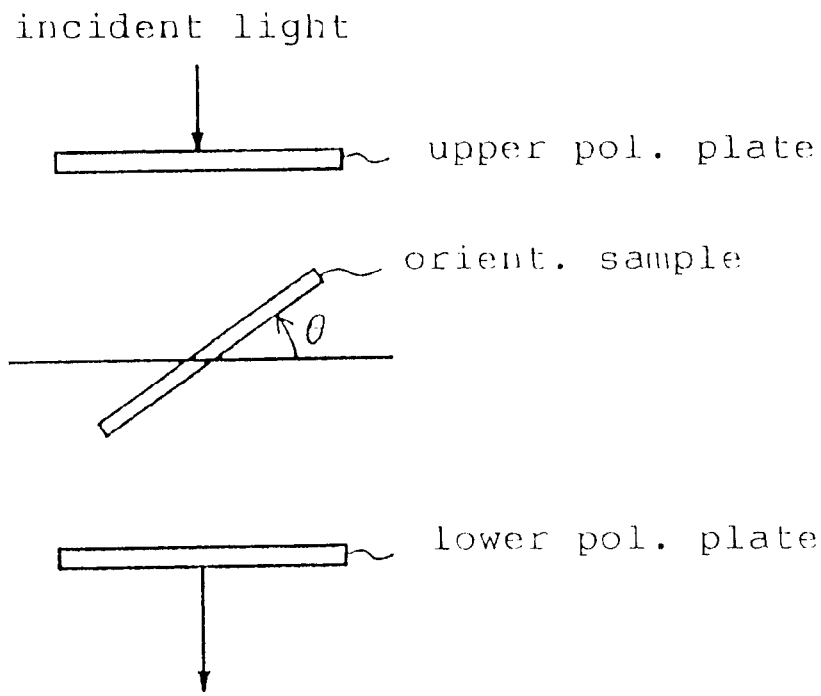
FIG. 3 is a view showing a configuration of an optical measurement system used for measurement on a tilt angle of a compensating film.
Figure 4:
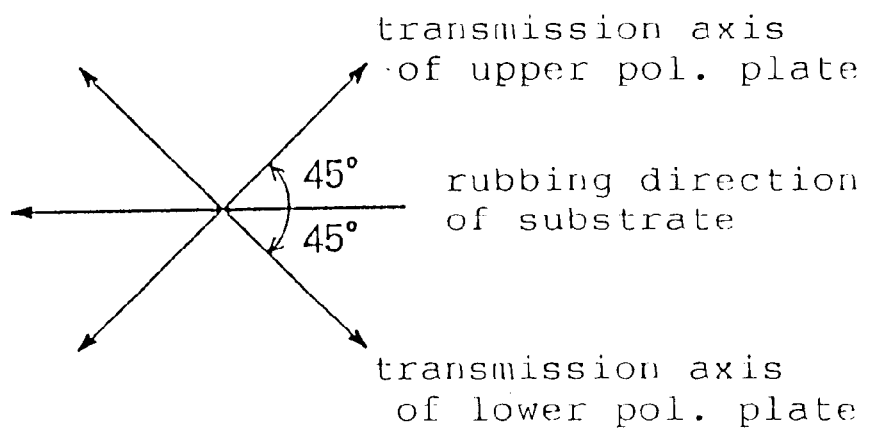
FIG. 4 is a representation showing a positional relation between a specimen and an axial direction of a polarizing plate in an optical measurement system used for measurement on a tilt angle of an compensating film.
Figure 5:
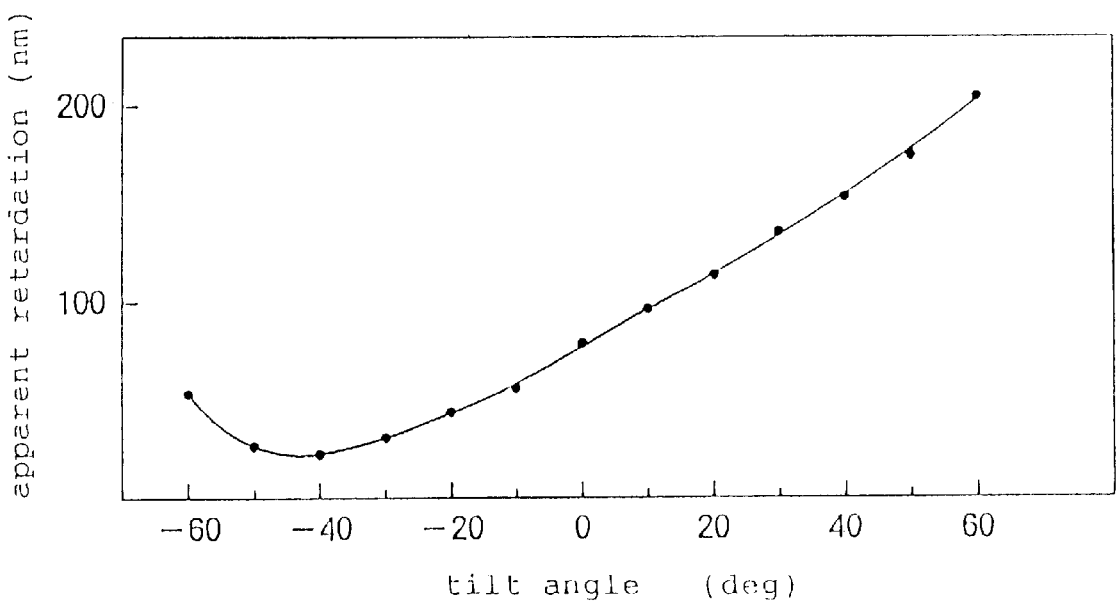
FIG. 5 is a graph showing a relation between the apparent retardation value and the inclination angle of a specimen in a comparative embodiment.

With use of an optical measuring system shown in FIGS. 3 and 4, a retardation value was measured while the film 2 was inclined to a rubbing direction of an alignment substrate. As a result, obtained a curve which was laterally unsymmetrical, and which has no angle of a retardation value 0, as shown in FIG. 5. It was seen from this result that the liquid crystal forming polyester has a director tilted toward the substrate but a uniform tilted orientational order (an orientational state in which an angle between a director and a substrate surface is constant along a thickness direction) was not created.

Confirmative Operation on Orientational Structure 2)

Figure 6:
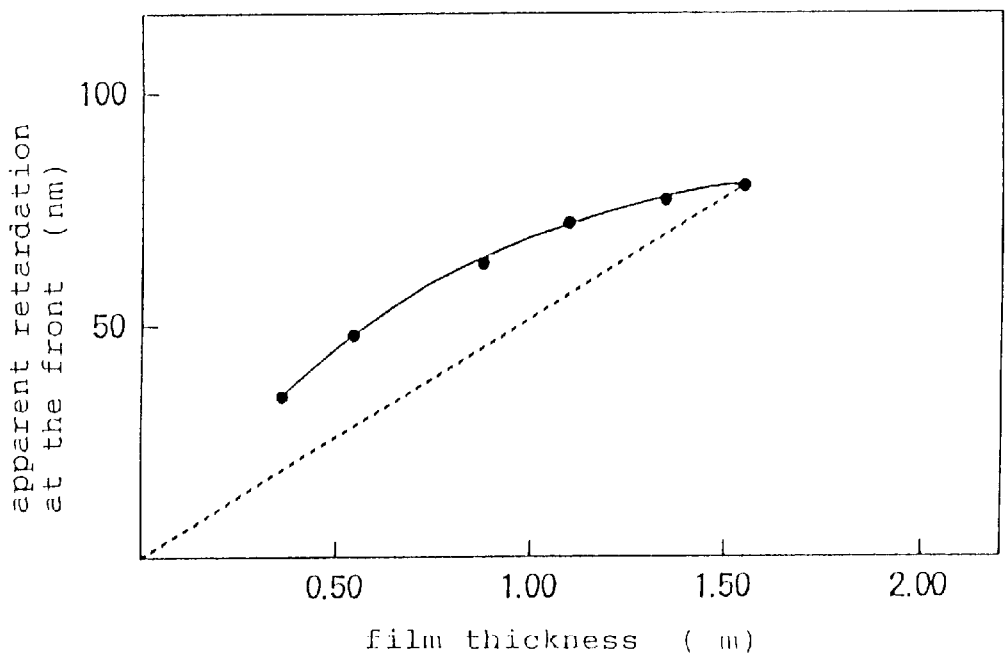
FIG. 6 is a graph showing a relation between the thickness of a compensating film after immersion and the frontal apparent retardation value.

The film 2 on the substrate was cut into five pieces and the pieces were immersed in a methanol solution including chloroform of 5 wt % in concentration for predetermined times so that some of a liquid crystalline layer of the film was dissolved from its surface. The predetermined times were set 15 sec, 30 sec, 1 min, 2 min and 5 min and thickness of each remained layers were 1.5 μm, 1.2 μm, 1.0 μm, 0.8 μm and 0.5 μm respectively. With use of the optical system shown in FIGS. 3 and 4, retardation values at θ=0 (a frontal retardation value) were measured and a relation between the thickness and the retardation value was obtained (FIG. 6). As can be seen from FIG. 6, no linear relation was not observed between a thickness and a retardation value and from this fact, the orientational state was not in a uniform tilted orientational order. A dotted line in the graph is a straight line to be observed on a film having a uniform tilted orientational order.

Confirmative Operation on Orientational Structure 3)

The liquid crystal forming polyester expressed by Formula 1) was applied on a high refractive index glass substrate (a refractive index was 1.84) having a rubbing polyimide film thereon to fabricate a film 3 after alignment and fixation in a similar way to that as mentioned above. Thus obtained film 3 was subjected to refractive index measurement. When the film 3 was disposed so that the glass substrate contacted with a prism surface of the refractometer, anisotropy in a refractive index was found in a film surface, a refractive index in the surface perpendicular to a rubbing direction was 1.56 and a refractive index in the surface parallel to the rubbing direction was 1.73 and a refractive index along a thickness direction was constant at 1.56 regardless of a direction to the film 3. From the facts, it was found that columnar liquid crystal molecules constituting a liquid crystalline polyester were aligned to assume a planar orientational order parallel to the substrate in the glass substrate side. Next, when the film 3 was disposed so that the air interface side of the film 3 contacted with the prism surface of the refractometer, there was observed no anisotropy in refractive index in the film surface and a refractive index was a constant value of 1.56 and a refractive index along a thickness direction was also constant at 1.73 regardless of a direction of the film 3. From the measurements, columnar liquid crystal molecules constituting the liquid crystalline polyester were aligned in a direction normal to a substrate surface in the air interface side.

Figure 7:
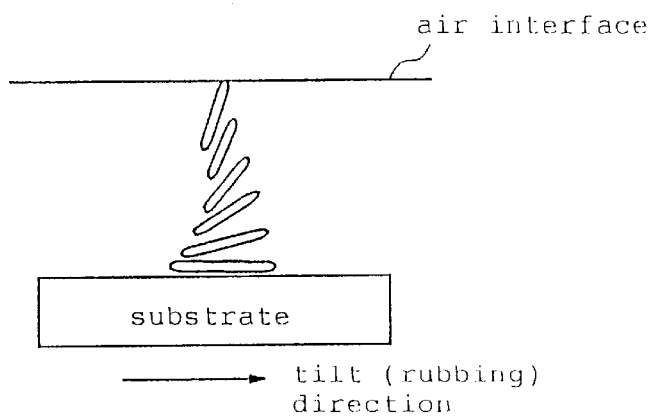
FIG. 7 is a representation illustrating a conception of an orientational structure of a compensating film.

Judging from the above operations 1) to 3), it was estimated that films fabricated from the liquid crystal forming polyester expressed by Formula 1) form a nematic hybrid orientational order and the polyester in a liquid crystalline state was aligned as shown in FIG. 7 by a control force from the substrate surface due to rubbing and another control force at the air interface.

Analysis on a tilt direction and estimation of an angle formed between a director and a substrate surface at an alignment substrate interface A high refractive index glass substrate having one rubbing polyimide film was superposed on a film 3 formed on a high refractive index substrate having another rubbing polyimide film and made to adhere in close contact on the film 3. That is, the film 3 was sandwiched by the two rubbing polyimide films. Upper and lower rubbing films were relatively disposed so as to have the respective rubbing directions form an angle of 180 degrees. In this condition, the films were subjected to a heat treatment at 230° C. for 30 min. Thus obtained specimen film was subjected to refractive index measurement and a polarization analysis. As a result of the refractive index measurement, refractive indexes on upper and lower surfaces were the same and refractive indexes in a film surface was 1.56 in the surface perpendicular to a rubbing direction, 1.73 in the surface parallel to the rubbing direction and 1.56 along a thickness direction of the film. From the data, it was found that directors of the upper and lower sides of the film 3 were almost parallel to respective substrate surfaces in the vicinity of each substrate interface. As a result of the polarization analysis, a refractive index structure is almost of a positive uniaxiality and as a result of a further precise analysis based on a crystal rotation method, a director was inclined in the vicinity of the substrate interfaces at a trace of angle. The angle of the director to a substrate surface was about 3 degrees. A direction of inclination of the director coincides with the rubbing direction (a tilt direction of the film and the rubbing direction are coincide with each other)

It is estimated from the above mentioned findings that a director at a substrate interface is almost determined by an interaction between the liquid crystalline polyester and the alignment substrate surface and an angle of the director of the film 3 formed on one of the alignment substrates to the film surface at the substrate interface is estimated to be 3 degrees.

Embodiment 1

A tetrachloroethane solution of the liquid crystal forming polyester (Formula 1)) of a 5 wt % concentration used in the comparative embodiment was prepared. The solution was applied on a glass substrate having a rubbing polyimide film by a spin coat method to form a solution film and a solvent was removed form the film. Thereafter, the film was subjected to a heat treatment at 250° C. for 30 min, followed by cooling and fixation. Thus obtained film on the glass substrate had a nematic hybrid orientational structure, was transparent and free of alignment defects with a uniform thickness of 0.85 µm. An average tilt angle was 44 degrees and coincides with a rubbing direction.

Figure 8:
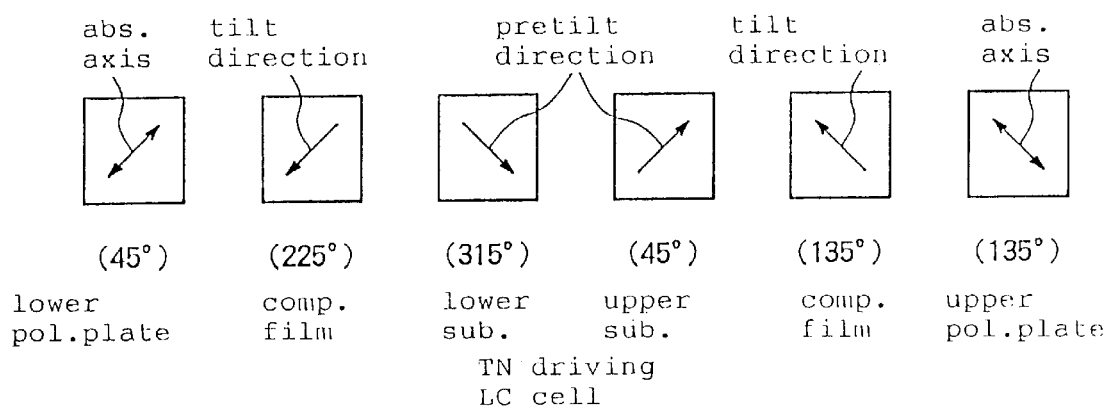
FIG. 8 is representations of directions and senses of axes of optical elements.
Figure 9:
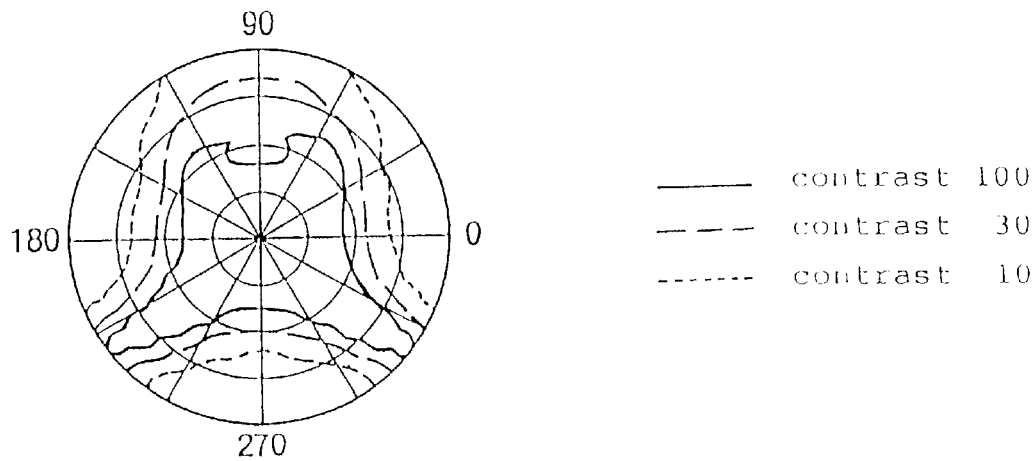
FIG. 9 is an iso-contrast curve of a first example (a visual field of 60 degrees).

Two films formed on the glass substrates having the rubbing polyimide film were respectively disposed on upper and lower sides of a liquid crystal cell for driving so as to assume axial configurations shown in FIG. 8. The two films on the upper and lower sides of the liquid crystal cell for driving were located so as to have a glass substrate side adjacent to the liquid crystal cell substrate. In the TN type liquid crystal cell for driving in use, ZL1-4792 as a liquid crystal forming material was employed and cell parameters were a cell gap of 4.8 µm, a twist angle of 90 degrees (left twist) and a pretilt angle of 4 degrees. A pretilt direction coincided with a rubbing direction of a liquid crystal cell substrate. A voltage of a rectangular wave train at 300 Hz was applied to the liquid crystal cell. A ratio in transmittance of a white display at 0 V to a black display at 6 V (a transmittance at a white display divided by a transmittance at a black display) was used as a contrast ratio and contrast ratio measurement was conducted with use of a FFP optical system DVS-3000 made by Hamamatsu Photonics K.K. to obtain isocontrast curves covering all the directions. The results are shown in FIG. 9.

Embodiment 2

Formula 2)

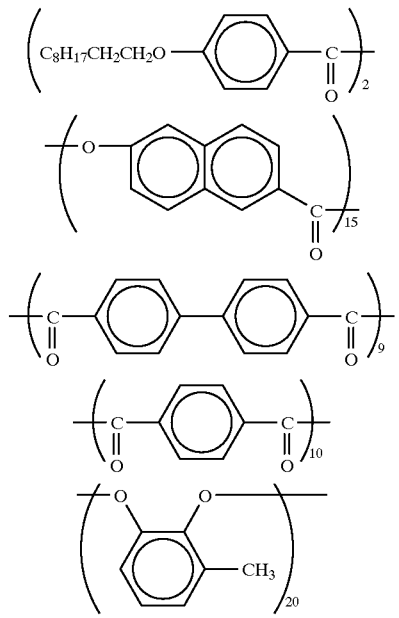

A liquid crystal forming polyester expressed by Formula 2) was synthesized in a similar way to that in the comparative embodiment. The liquid crystal forming polyester had a logarithmic viscosity of 0.20, a liquid crystalline phase thereof was a nematic phase, an isotropic to liquid crystalline phase transition temperature was 300° C. or higher and a glass transition temperature was 115° C. As a result of an alignment test similar to the comparative embodiment, it was sound that this liquid crystalline polyester had a homeotropic alignment nature and showed an optically positive uniaxiality.

A tetrachloroethane solution of the liquid crystal forming polyester expressed by Formula 2) of a 5 wt % concentration was prepared. The solution was applied on a glass substrate having a rubbing polyimide film by a spin coat method and the film was dried. After the drying, the film was subjected to a heat treatment at 250° C. for 30 min, followed by cooling and fixation. In such a manner, obtained was a film formed on the glass substrate with the rubbing polyimide film interposing therebetween. Thus obtained film was subjected to various optical measurements as in the comparative embodiment and it was confirmed that the film had a nematic hybrid orientational structure. The film was transparent, and had no alignment defects and a uniform thickness of 0.9 µm. An average tilt angle of the film was 45 degrees and a tilt direction coincided with a direction of rubbing which was given to the rubbing polyimide film.

Figure 10:
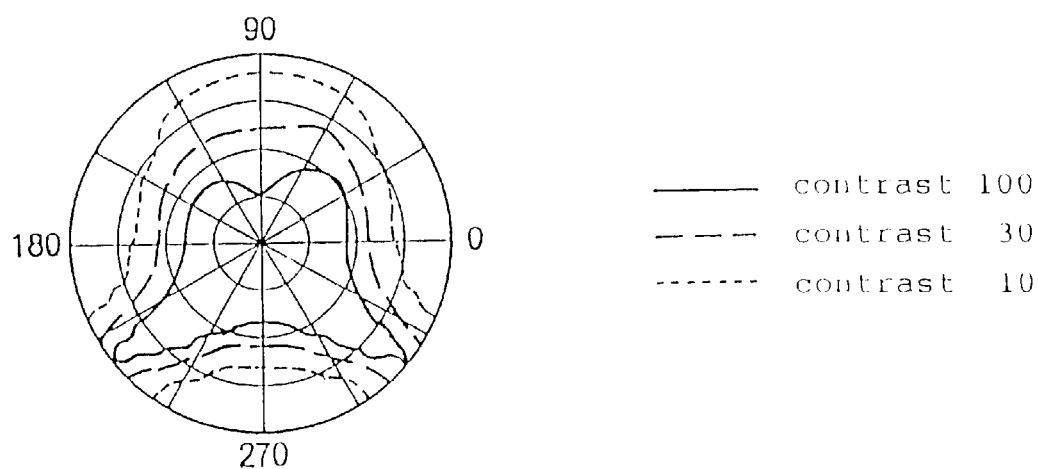
FIG. 10 is an iso-contrast curve of a second example (a visual field of 60 degrees).

Two films formed on glass substrates each having the rubbing polyimide film were respectively disposed on upper and lower sides of the liquid crystal cell for driving used in Embodiment 1 so as to assume axial configurations shown in FIG. 8. The films disposed on the upper and lower sides of the liquid crystal cell were positioned so that the glass substrate side of the film was located more adjacent to the liquid crystal cell. Then, isocontrast ratio curves were drawn by a similar method to Embodiment 1. The results are shown in FIG. 10.

Embodiment 3

Formula 3)

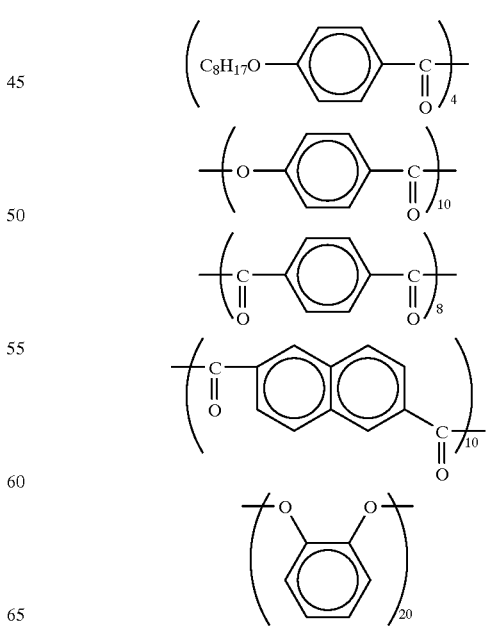

Formula 4)

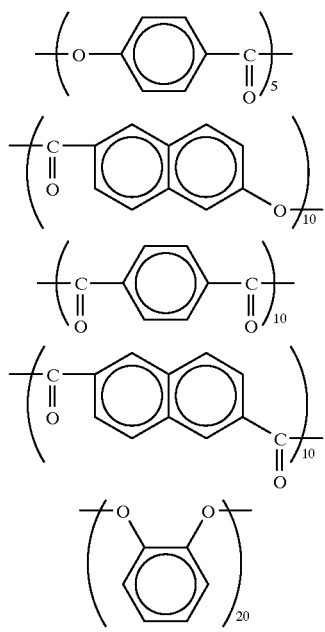

Liquid crystal forming polyesters expressed by Formulae 3) and 4) were synthesized. The liquid crystal forming polyester expressed by Formula 3) had a logarithmic viscosity of 0.12, a liquid crystalline phase thereof was a nematic phase, an isotropic to liquid crystalline phase transition temperature was 200° C. and a glass transition temperature was 90° C. As a result of an alignment test similar to the comparative embodiment, it was sound that the liquid crystalline polyester expressed by Formula 3) showed a homeotropic alignment nature and had a positive uniaxiality.

The liquid crystal forming polyester expressed by Formula 4) had a logarithmic viscosity of 0.15, a liquid crystalline phase thereof was a nematic phase, an isotropic to liquid crystalline phase transition temperature was 300° C. or higher. A phenol/tetrachloroethane mixture solution (6/4 wt ratio) of the liquid crystal forming polyester of a 10 wt % concentration was prepared, the solution was applied on various substrates for an alignment test by a screen printing method and the film was dried and further subjected to a heat treatment at 230° C. for 10 min. As substrates, employed were substrates made of soda glass, boro-silicated glass, and a polyethyleneterephthalate film, a polyimide film, a polyetherimide film, a polyetheretherketone film and a polyethersulfone film and a schlieren texture was observed in an liquid crystalline phase on any substrate with use of a microscope and it was found that the liquid crystalline polyester had a homogeneous alignment nature.

A tetrachloroethane solutions of a mixture of the liquid crystal forming polyesters expressed by Formulae 3) and 4) at a weight ratio of 20 to 80 of a 5 wt % combined concentration was prepared. The solution was applied on a substrate and the film was dried and subjected to a heat treatment in the same conditions as in Embodiment 2 to fabricate a film. A thickness of the film was 0.50 μm. Thus obtained film was subjected to various optical measurements as in the comparative embodiment and the results were obtained that the film had a nematic hybrid orientational structure and an average tilt angle of the film was 35 degrees. A tilt direction of the film coincided with a direction of rubbing which was given to the rubbing polyimide film.

Figure 11:
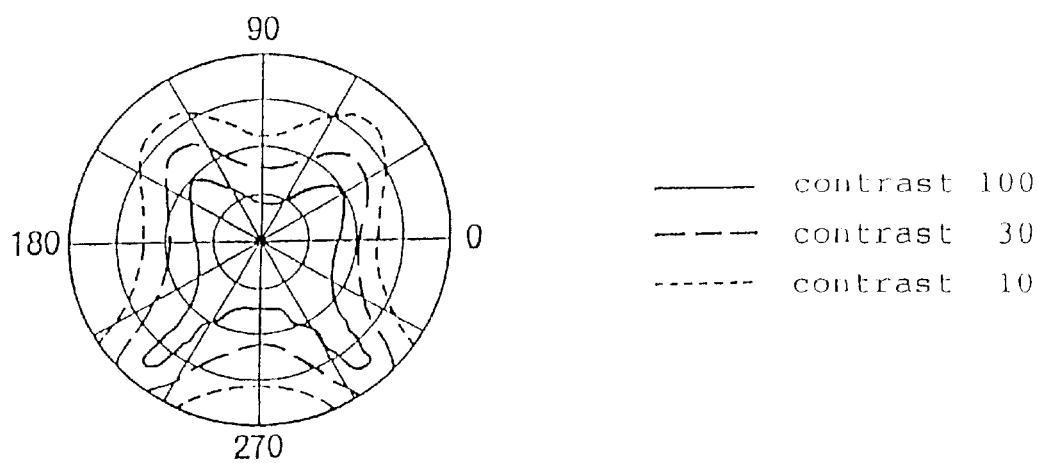
FIG. 11 is an iso-contrast curve of a third example (a visual field of 60 degrees).

Two films formed on glass substrates each having the rubbing polyimide film were respectively disposed on upper and lower sides of the liquid crystal cell for driving so as to assume axial configurations shown in FIG. 8. The films disposed on the upper and lower sides of the liquid crystal cell were positioned so that the glass substrate side of the film was located more adjacent to the liquid crystal cell. A liquid crystal cell for driving same as that used in Embodiment 1 was used and isocontrast ratio curves were drawn by a similar method to Embodiment 1. The results are shown in FIG. 11.

Embodiment 4

Formula 5)

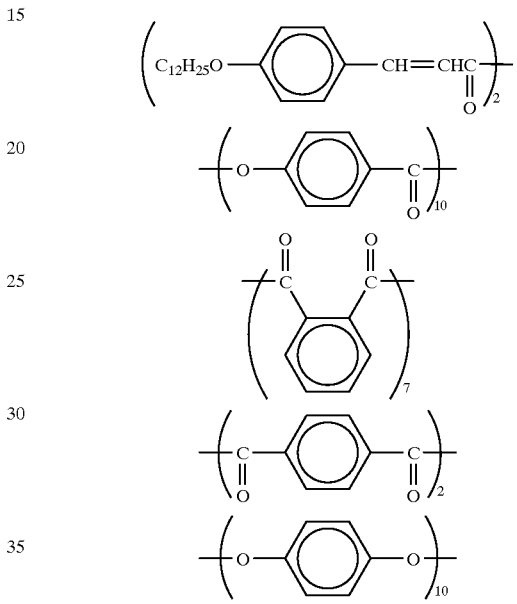

Formula 6)

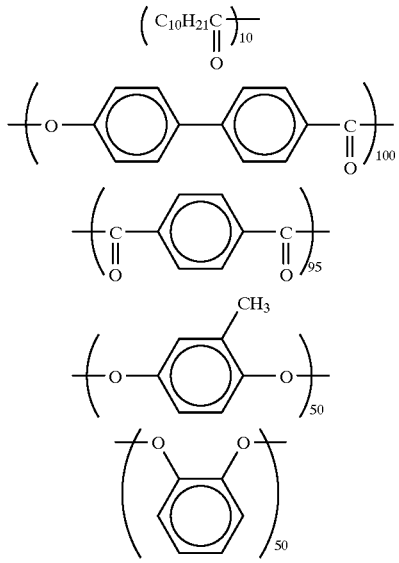

Liquid crystal forming polyesters expressed by Formulae 5) and 6) were synthesized. The liquid crystal forming polyester expressed by Formula 5) had a logarithmic viscosity of 0.20, a liquid crystalline phase thereof was a nematic phase, an isotropic to liquid crystalline phase transition temperature was 220° C. The liquid crystal forming polyester expressed by Formula 6) had a logarithmic viscosity of 0.21, a liquid crystalline phase thereof was a nematic phase, an isotropic to liquid crystalline phase transition temperature was 190° C. As results of alignment tests similar to the comparative embodiment, it was found that the liquid crystalline polyesters expressed by Formulae 5) and 6) both showed a homeotropic alignment nature and had an optical positive uniaxiality. A phenol/tetrachloroethane mixture solution (6/4 wt ratio) of a mixture of the liquid crystal forming polyesters expressed by Formulae 5) and 6) at a ratio of 90 to 10 of a 10 wt % combined concentration was prepared. The solution was applied on a polyethyleneterephthalate film receiving a rubbing treatment with a width of 40 cm by a roll coat method along a length of 10 m of the film. The film was dried by a hot air blow at 120° C. and the film was further subjected to a heat treatment at 180° C. for 20 min, followed by cooling and fixation. A triacetylcellulose film was stuck on a surface of thus obtained film with a pressure sensitive adhesive interposing therebetween. Then, the polyethyleneterephthalate film used as a substrate was separated and a film constituted of the liquid crystal forming polyester was transferred on the triacetylcellulose film.

The film on the triacetylcellulose film obtained as mentioned above was subjected to various optical measurements as in the comparative embodiment and it was found that the film had a nematic hybrid orientational structure. A thickness of the film was 0.60 μm and an average tilt angle of the film along a thickness direction was 35 degrees. A tilt direction of the film coincided with a direction of rubbing which was given to the polyethyleneterephthalate film which was removed.

Figure 12:
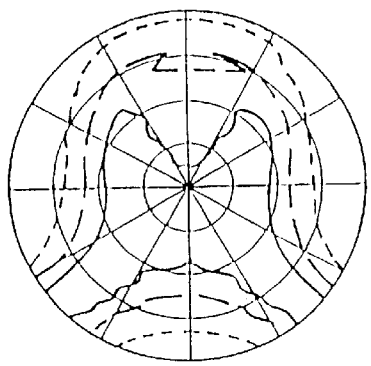
FIG. 12 is an iso-contrast curve of a fourth example (a visual field of 60 degrees).

Two films formed on the triacetylcellulose films were respectively disposed on upper and lower sides of the liquid crystal cell for driving so as to assume axial configurations shown in FIG. 8. The films disposed on the upper and lower sides of the liquid crystal cell were positioned so that the triacetylcellulose film side of the film was located more adjacent to the liquid crystal cell. A liquid crystal cell for driving same as that used in Embodiment 1 was used and isocontrast ratio curves were drawn by a similar method to Embodiment 1. The results are shown in FIG. 12.

Embodiment 5

Formula 7)

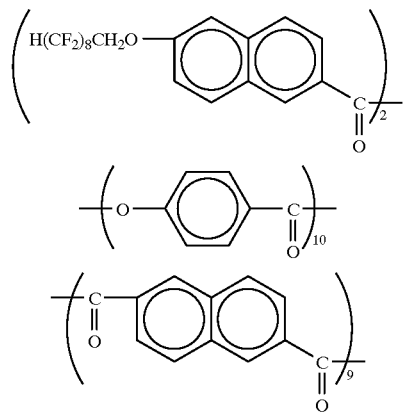

-continued

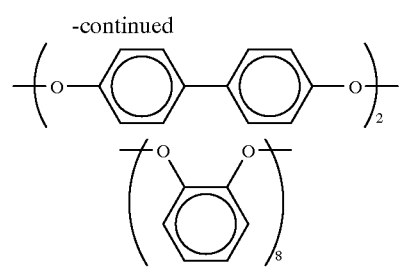

Formula 8)

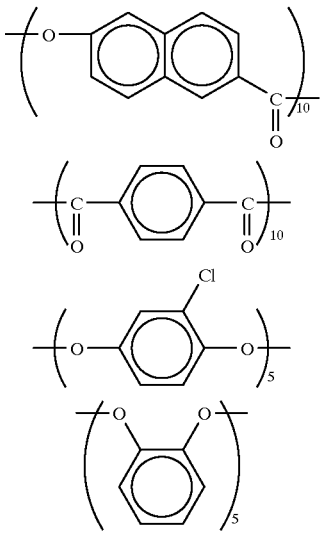

Liquid crystal forming polyesters expressed by Formulae 7) and 8) were synthesized. The liquid crystal forming polyester expressed by Formula 7) had a logarithmic viscosity of 0.10, a liquid crystalline phase thereof was a nematic phase, an isotropic to liquid crystalline phase transition temperature was 180° C. As results of alignment tests similar to the comparative embodiment, it was found that the liquid crystalline polyesters expressed by Formula 7) showed a homeotropic alignment nature and had an optically positive uniaxiality.

The liquid crystal forming polyester expressed by Formula 8) had a logarithmic viscosity of 0.18, a liquid crystalline phase thereof was a nematic phase, an isotropic to liquid crystalline phase transition temperature was 300° C. or higher. As results of alignment tests similar to Embodiment 3, it was found that the liquid crystalline polyester expressed by Formula 8) showed a homogeneous alignment nature.

A N-methyl-2-pyrolidone solution of a mixture of the liquid crystal forming polyesters expressed by Formulae 7) and 8) at a ratio of 50 to 50 of a 8 wt % combined concentration was prepared. The solution was applied on a polyetheretherketone film receiving a rubbing treatment with a width of 40 cm by a die coat method along a length of 10 m of the film. The film was dried by a hot air blow at 120° C. and the film was further subjected to a heat treatment at 220° C. for 10 min, followed by cooling and fixation. A triacetylcellulose film was stuck on a surface of thus obtained film with a pressure sensitive adhesive. Then, the polyetheretherketone film used as a substrate was separated and a film constituted of the liquid crystal forming polyester was transferred on the triacetylcellulose film.

The film on the triacetylcellulose film obtained as mentioned above was subjected to various optical measurements as in the comparative embodiment and it was found that the film had a nematic hybrid orientational structure. A thickness of the film was 0.70μm and an average tilt angle of the film along a thickness direction was 37 degrees. A tilt direction of the film coincided with a direction of rubbing which was given to the polyetheretherketone film which was removed.

Figure 13:
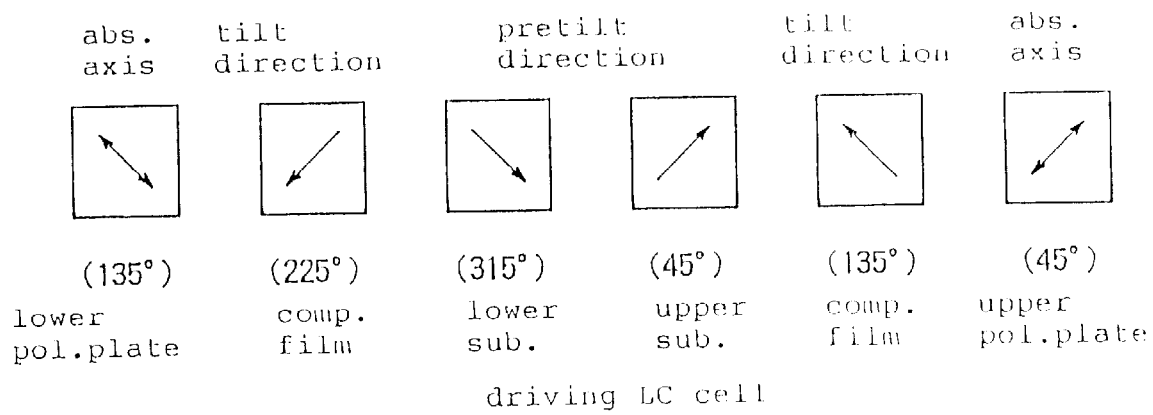
FIG. 13 is representations of directions and senses of axes of optical elements in a fifth example.
Figure 14:
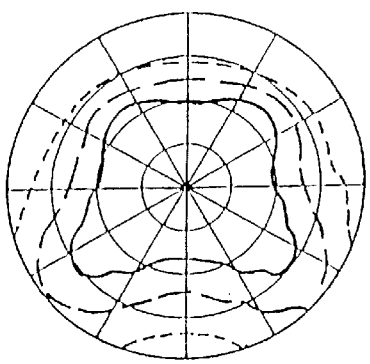
FIG. 14 is an iso-contrast curve of the fifth example (a visual field of 60 degrees).

Two films formed on the triacetylcellulose films were respectively disposed on upper and lower sides of the liquid crystal cell for driving so as to assume axial configurations shown in FIG. 13. The films disposed on the upper and lower sides of the liquid crystal cell were positioned so that the triacetylcellulose film side of the film was located more adjacent to a polarizing plate. A liquid crystal cell for driving same as that used in Embodiment 1 was used and isocontrast ratio curves were drawn by a similar method to Embodiment 1. The results are shown in FIG. 14.

What is claimed is:

1. A liquid crystal display device comprising a liquid crystal cell of a TN type for driving sandwiched by a pair of upper and lower polarizing plates in which at least one compensating film is inserted between the liquid crystal cell and the upper polarizing plate or between the liquid crystal cell and the lower polarizing plate, or at least two compensating films are respectively inserted between the liquid crystal cell and the upper polarizing plate and between the liquid crystal cell and the lower polarizing plate, the compensating film consisting essentially of a liquid crystalline polymer showing optically a positive uniaxiality, the liquid crystalline polymer being fixed in a nematic hybrid orientational order; and an angle between a tilt direction of the compensating film and a pretilt direction on a liquid crystal cell substrate opposed to a substrate for the liquid crystal cell for driving closest to the compensating film is in the range of 165 to 195 degrees.

2. A liquid crystal display device according to claim 1, wherein the liquid crystalline polymer which optically shows a positive uniaxiality is a liquid crystalline polymer compound of a homeotropic alignment, one end or both ends of whose polymer chain have a monofunctional structure unit, or a liquid crystalline polymer composition comprising at least one liquid crystalline polymer compound of a homeotropic alignment, one end or both ends of whose polymer chain have a monofunctional structure unit.

3. A liquid crystal display device according to claim 2 wherein the liquid crystalline polymer compound is a main chain type liquid crystalline polymer selected from the group consisting of polyesters, polyamides and polycarbonates each of which has a monofunctional structural unit at one end or at both ends of the polymeric molecule.

4. A liquid crystal display device according to claim 2 wherein the monofunctional structural unit is

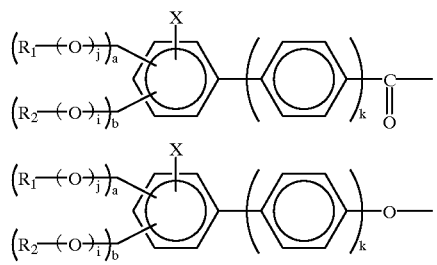

-continued

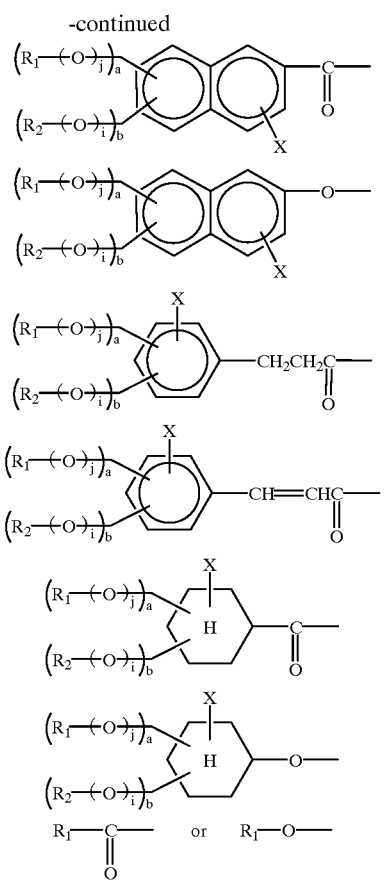

where $R_1$ and $R_2$ are the same or different and are $C_3$–$C_{20}$ alkyl or $C_2$–$C_{20}$ fluoroalkyl; X is halogen; i is 0 or 1; j is 0 or 1; k is 0 or 1; a is 0 or 1; and b is 0 or 1, with the proviso that the sum of a and b is not 0.

5. A liquid crystal display device according to claim 4 wherein said monofunctional structural unit is $CH_3CH_2CH_2$—, $CH_3CH(CH_3)CH_2$—,
$C(CH_3)_3$—, $(CH_3)_2CH$—, $CH_3(CH_2)_3$—, $C_5H_{11}$—,
$C_9H_{19}$—, $C_6H_{13}$—, $C_8H_{17}$—, $C_7H_{15}$—, $C_{10}H_{21}$—,
$C_{12}H_{25}$—, $C_{14}H_{29}$—, $C_{18}H_{37}$—, $C_{16}H_{33}$—, $C_{20}H_{41}$—,
$CF_3CH_2$—, $CF_3CF_2$—, $(CF_3)_2CF$—,
$(CF_3)_2CF(CF_2)_2$—, $C_6F_{13}$—, $C_8F_{17}$—,
$CF_3(CF_2)_3CH_2CH_2$—, $(CF_3)_2CF(CF_2)_8$—,
$CHF_2CF_2CH_2$—, $CF_3CH_2CH_2$—,
$(CF_3)_2CF(CF_2)_8CH_2CH_2$—,
$CF_3(CF_2)_7CH_2CH_2$—, $H(CF_2)_4CH_2$—,
$CF_3(CF_2)_9CH_2CH_2$, $CF_3(CF_2)_3(CH_2)_6$—,
$CF_3CF_2(CH_2)_6$—, $CHF_2CF_2CH_2$—,
$CF_3(CF_2)_5CH_2CH_2$—, $H(CF_2)_6CH_2$—,
$H(CF_2)_4CH_2$— or $H(CF_2)_8CH_2$—.

* * * * *